United States Patent [19]
Fukushima

[11] Patent Number: 5,992,589
[45] Date of Patent: *Nov. 30, 1999

[54] TORQUE CONVERTER HAVING BOTH A LOCK-UP CLUTCH AND A DISENGAGING CLUTCH MECHANISM

[75] Inventor: Hirotaka Fukushima, Hirakata, Japan

[73] Assignee: EXEDY Corporation, Neyagawa, Japan

[ * ] Notice: This patent is subject to a terminal disclaimer.

[21] Appl. No.: 09/100,980

[22] Filed: Jun. 22, 1998

Related U.S. Application Data

[62] Division of application No. 08/912,579, Aug. 18, 1997, Pat. No. 5,881,852, which is a division of application No. 08/603,043, Feb. 16, 1996, Pat. No. 5,695,028.

[30] Foreign Application Priority Data

| Feb. 23, 1995 | [JP] | Japan | 7-035038 |
| Feb. 23, 1995 | [JP] | Japan | 7-035039 |
| Feb. 23, 1995 | [JP] | Japan | 7-035040 |
| Feb. 23, 1995 | [JP] | Japan | 7-035041 |
| Mar. 14, 1995 | [JP] | Japan | 7-054813 |

[51] Int. Cl.$^6$ .................................................. F16H 45/02
[52] U.S. Cl. .................................... 192/3.29; 464/24
[58] Field of Search ...................... 192/3.29, 3.3; 464/24; 267/165

[56] References Cited

U.S. PATENT DOCUMENTS

| 2,289,019 | 7/1942 | Jessen . |
| 2,700,444 | 1/1955 | Ahlen . |
| 2,775,330 | 12/1956 | Schjolin et al. . |
| 3,118,524 | 1/1964 | Howard et al. . |
| 3,235,043 | 2/1966 | Maurice et al. . |
| 4,733,761 | 3/1988 | Sakakibara . |
| 4,784,019 | 11/1988 | Morscheck . |
| 4,844,216 | 7/1989 | Fukushima ......................... 192/3.29 X |
| 4,860,861 | 8/1989 | Gooch et al. . |
| 4,964,504 | 10/1990 | Friedmann . |
| 4,966,261 | 10/1990 | Kohno et al. .......................... 192/3.29 |
| 5,062,517 | 11/1991 | Muchmore et al. ............... 192/3.29 X |
| 5,086,892 | 2/1992 | Schierling .............................. 192/3.29 |
| 5,103,947 | 4/1992 | Okuzumi . |
| 5,195,621 | 3/1993 | Dull et al. ............................. 192/3.29 |
| 5,320,202 | 6/1994 | Wakahara ................................ 192/3.3 |
| 5,332,073 | 7/1994 | Iizuka ...................................... 192/3.3 |
| 5,562,541 | 10/1996 | Fukushima .......................... 192/208 X |
| 5,669,475 | 9/1997 | Matsuoka .............................. 192/3.29 |
| 5,685,404 | 11/1997 | Fukushima . |
| 5,803,441 | 9/1998 | Yamamoto ............................ 464/24 X |

*Primary Examiner*—Rodney H. Bonck
*Attorney, Agent, or Firm*—Shinjyu Intellectual Property Firm

[57] ABSTRACT

A torque converter is provided with both a lock-up clutch and a disengaging clutch for use with a manual transmission. When the disengaging clutch is engaged, torque is transmittable through a torque converter impeller and turbine fluid coupling. When the lock-up clutch is engaged, torque is mechanically transmitted through the lock-up clutch to a manual transmission input shaft. A single control mechanism effects selective engagement and disengagement of both the lock-up clutch and the disengaging clutch. In an alternate embodiment of the present invention, a weight may be engaged and disengaged from various components within the torque converter to change the ratio of a moment of inertia of a power input mechanism and a power output mechanism defined by portions of the torque converter. A lock-up clutch in the alternate embodiment and the weight are also engaged and disengaged by a single control mechanism.

9 Claims, 24 Drawing Sheets

TORQUE CONVERTER HAVING BOTH A LOCK-UP CLUTCH AND A DISENGAGING CLUTCH MECHANISM

The following application is a division of U.S. Ser. No. 08/912,579, filed Aug. 18, 1997, now U.S. Pat. No. 5,881,852, which is a division of U.S. Ser. No. 08/603,043, filed Feb. 16, 1996, now U.S. Pat. No. 5,695,028. The entire disclosure of U.S. Ser. No. 08/912,579, filed Aug. 18, 1997 is hereby incorporated by reference in its entirety.

BACKGROUND OF THE INVENTION

A. Field of the Invention

The present invention relates to a torque converter used for transmitting torque from a crank shaft of an engine to a manual transmission, and in particular, the present invention relates to a torque converter having both a lock-up clutch and a disengaging clutch mechanism.

B. Description of the Related Art

Recently, automotive manufacturers have begun using a torque converters with manual transmissions. Torque converters, in general, include a converter housing with an impeller formed on an inner surface of the housing, a turbine rotatably supported within the housing and a stator rotatably supported within the housing between the turbine and the impeller. The converter housing is typically formed with power input front cover which is connected to the crankshaft of an engine. One such torque converter is disclosed in Japanese Unexamined Utility Model No. SHO/64/31355, for example. In such a torque converter, a disengaging clutch couples the turbine and a power input shaft of a transmission allowing the torque converter to be manually engaged and disengaged to accommodate use with a manual transmission. The disengaging clutch is connected to one surface of the turbine. In other torque converters, a lock-up clutch may also be provided to directly couple the power input front cover with the turbine.

When starting a vehicle equipped with a torque converter and a manual transmission, torque is applied from the power input front cover to an impeller of the torque converter, causing the impeller to urge fluid within the torque converter to move toward the impeller causing the turbine to rotate. As a result, the vehicle starts to move smoothly. When the speed of rotation of a power input shaft of the transmission reaches a predetermined level, the lock-up clutch engages so that the torque is transmitted directly from the power input front cover to the power input shaft of the transmission. Since the torque is mechanically transmitted, the vehicle runs with greater fuel efficiency. When changing gears, the disengaging clutch is operated and the gears of the manual transmission may be shifted.

One drawback to the above-described configuration is that the torque converter has a rather complicated configuration in that the disengaging clutch and the lock-up clutch require separate mechanisms for engagement and disengagement. Such a configuration is complicated and expensive to manufacture.

There are torque converter configurations where the lock-up clutch includes a piston capable of being urged into press-contact with the inner surface of the front cover of the torque converter housing for engagement of the lock-up clutch. The lock-up clutch may further include a plurality of coil springs coupling the piston with the power output element. Another prior art torque converter includes a friction resistance generating mechanism which generates friction resistance when torsional vibration is applied to a lock-up clutch.

In such lock-up clutches, torsional rigidity of the coil spring must be reduced in order to effectively dampen torsional vibration under small load conditions. It is possible to reduce the wire diameter of the spring coil in order to reduce the torsional rigidity of the coil spring, however reducing the wire diameter also causes a corresponding reduction in the overall torque transmission capability of the torque converter. Thus, the coil diameter of the coil spring is usually kept at a relatively large diameter so that capacity of torque transmission is retained. However, the torsional rigidity of the torque converter is increased as a result. Further, the large diameter coil spring occupies a larger space, thus preventing downsizing the lock-up clutch.

In order to reduce the transmission from developing abnormal sounds like clattering sound and internal indistinct sounds during ordinary driving conditions, it is desirable for the resonance frequency of the torque converter to be reduced to a level generally equal to or below the idle speed of the engine associated with the torque converter and manual transmission.

In the above-described prior art torque converter and the vehicle in which it is used, under the ordinary driving conditions where the lock-up clutch operates, the power transmission system may be divided into a power input portion and a power output portion which are separated by the coil spring of the lock-up clutch therebetween. The dynamic characteristics of the power input portion and the power output portion must be evaluated in order to design a torque converter which provides adequate vibration reduction and reliable torque transmission. Ideally, in a power transmission system, it is necessary to sufficiently increase a ratio of moment of inertia of the power output portion to the power input portion to reduce the resonance frequency to be equal to or less than the idle speed of the engine. However, when the lock-up clutch is disengaged, it is desirable to reduce an inertial mass of a power output portion so as not to exert an adverse effect to components like clutches.

A centrifugal mechanism has been used to couple and uncouple an annular weight to the lock-up clutch. In such a design, as the speed of rotation of the turbine increases, centrifugal force works so that the annular weight is coupled to power output elements including the turbine. Consequently, the ratio of moment of inertia of the power output portion to that of the power input portion becomes larger, and the resonance frequency can be reduced to a low frequency region in a drive system. As the speed of rotation of the turbine is reduced, the annular weight is uncoupled from the power output elements like the turbine. This is effective to avoid some causes of malfunctions of components in clutches and transmission.

A disadvantage to the annular weigh configuration is that the coupling and uncoupling of the weight in the prior art is effected using a centrifugal mechanism, and therefore accurate control of coupling and uncoupling is dependent upon centrifugal forces. Such forces may not provide adequate or desirable control for coupling and uncoupling of the annular weight.

SUMMARY OF THE INVENTION

Accordingly, one object of the present invention to simplify an inner configuration of a torque converter which has a disengaging clutch and a lock-up clutch.

It is another object of the present invention to downsize the width of spring elements while maintaining desired spring characteristics.

It is another object of the present invention to downsize axial dimensions of a lock-up clutch mechanism.

Another object of the present invention is to control coupling and uncoupling of a weight element to portions within a torque converter housing.

In a first aspect of the present invention, a torque converter for transmitting torque from a crank shaft of an engine to a manual transmission, includes a torque converter main body having a front cover, the torque converter main body and the front cover defining a hydraulic oil chamber, an impeller fixed to the front cover within the hydraulic oil chamber, and a turbine disposed within the hydraulic oil chamber opposed to the impeller. A manual transmission input shaft extends into the hydraulic oil chamber. A disengaging clutch is disposed within the hydraulic oil chamber, the disengaging clutch mechanically coupled to the turbine and to the manual transmission input shaft, the disengaging clutch configured to mechanically engage and disengage the turbine from the manual transmission input shaft. A lock-up clutch is disposed within the hydraulic oil chamber, the lock-up clutch being coupled to the front cover and the manual transmission input shaft, the lock-up clutch configured to mechanically engage and dis-engage the front cover from the manual transmission input shaft. A clutch operation mechanism at least partially disposed within the main body is configured to shift between operation modes, the operation modes including a start mode, a drive mode and a speed change, wherein in the start mode the disengaging clutch is engaged and the lock-up clutch is disengaged, in the drive mode the lock-up clutch is engaged and in the speed change mode the disengaging clutch and the lock-up clutch are both disengaged.

Preferably, the disengaging clutch of the torque converter includes at least one first output plate mechanically connected to the manual transmission input shaft, a power input plate and a biasing cone spring. Further, it preferred to have the lock-up clutch have at least one second output plate mechanically connected to the manual transmission input shaft. The clutch operation mechanism includes a pressure plate disposed adjacent to the second output plate and a load applying plate is disposed between the first and second output plates. The biasing cone spring urges the first output plate and the power input plate toward the load applying plate and the pressure plate is configured to engage a portion of the power input plate. The pressure plate is configured to engage the second power output plate for selective engagement and disengagement of the lock-up clutch and selective engagement and disengagement of the disengaging clutch.

In another aspect of the invention, the disengaging clutch preferably includes at least one first output plate mechanically connected to the manual transmission input shaft, a power input plate and a biasing cone spring. The lock-up clutch includes at least one second output plate mechanically connected to the manual transmission input shaft. The clutch operation mechanism has a pressure plate disposed adjacent to the second output plate and a load applying plate disposed between the first and second output plates. The biasing cone spring urges the first output plate and the power input plate toward the load applying plate and the pressure plate is configured to engage the second power output plate for selective engagement and disengagement of the lock-up clutch. Further, a cover plate disposed within the main body contacts the pressure plate for movement therewith, the cover plate being configured to engage a portion of the power input plate for selective engagement and disengagement of the disengaging clutch.

In yet another aspect of the present invention the disengaging clutch has at least one first output plate mechanically connected to the manual transmission input shaft and a power input plate and a biasing cone spring. The lock-up clutch includes at least one second output plate mechanically connected to the manual transmission input shaft. The clutch operation mechanism has a pressure plate disposed adjacent to the second output plate. Further, the biasing cone spring urges the first output plate and the power input plate toward the turbine, and the pressure plate is configured to engage the second power output plate for selective engagement and disengagement of the lock-up clutch. The cover plate is disposed within the main body and is configured for movement with the pressure plate, the cover plate being configured to engage a portion of the power input plate for selective engagement and disengagement of the disengaging clutch.

In yet another aspect of the present invention, a pressure plate is urged by a diaphragm spring toward the disengaging clutch and the lock-up clutch. A hydraulic controller is in fluid communication with the torque converter main body for controlling movement of the diaphragm spring, movement of the diaphragm spring being predetermined to define the operation modes.

In still another aspect of the invention, a vibration dampening mechanism is mechanically connected to the manual transmission input shaft and the lock-up clutch.

In yet another aspect of the invention, a vibration dampening mechanism is mechanically connected to the turbine and the lock-up clutch.

In another configuration of the present invention, a torque converter for transmitting torque from a crank shaft of an engine to a manual transmission includes a torque converter main body having a front cover, an impeller fixed to the front cover, the front cover and the impeller defining a hydraulic oil chamber, and a turbine disposed adjacent to the impeller within the hydraulic oil chamber. A disengaging clutch disposed between the turbine and a manual transmission input shaft which extends into the main body. A lock-up clutch mechanically is coupled to the front cover. A vibration dampening mechanism couples the disengaging clutch and the lock-up clutch in circular directions. A clutch operating mechanism is configured to selectively engage and disengage the disengaging clutch and the lock-up clutch in a plurality of shifting modes, the shifting modes including: a start mode where the disengaging clutch is engaged and the lock-up clutch is disengaged; a drive mode where the disengaging clutch and the lock-up clutch are engaged, and a speed change mode where the disengaging clutch is disengaged.

Preferably the clutch operating mechanism includes a shift element engaging both the disengaging clutch and the lock-up clutch, a first biasing element urging the shift element toward both the disengaging clutch and the lock-up clutch, and an operating element for selectively moving the first pushing element. The disengaging clutch has a plurality of first plate elements and a second biasing element urging the first plate elements against each other, the second biasing element being configured to urge the first plate elements into contact with one another in response to movement of the first biasing element. Further, the lock-up clutch includes a plurality of second plate elements, the second plate elements being urged into contact with one another in response to movement of the first urging element.

Preferably, the torque converter includes a supporting element supporting the first urging element and contacting the first urging element.

In the torque converter of the present invention, when the clutch operating mechanism enters the start mode, the disengaging clutch is engaged while the lock-up clutch is disengaged. As a result, the torque transmitted from the power input front cover to the impeller is transmitted by fluid pressure to the turbine and further transmitted to the manual transmission through the disengaging clutch and the power output mechanism. As a result, the vehicle to starts to more smoothly than the prior art manual transmissions with only clutch for engagement and disengagement.

When the clutch operating mechanism enters the drive mode, the lock-up clutch is engaged. Thus, the torque in the power input front cover is transmitted directly to the power output mechanism through the lock-up clutch and is transmitted to the manual transmission. In this situation, since the torque of the power input front cover is mechanically transmitted to the manual transmission, the vehicle runs with improved fuel economy.

When the clutch operating mechanism enters the speed change mode, the disengaging clutch and the lock-up clutch are disengaged. Consequently, the torque of the power input front cover is not transmitted toward the manual transmission. In this situation, the driver can change gears in the manual transmission.

In this torque converter, the single clutch operating mechanism permits simultaneous operation of both the disengaging clutch and the lock-up clutch. Hence, an inner configuration of the torque converter is greatly simplified.

In the event that the power output element includes an elastic element, torsional vibration is absorbed when the torque is applied toward the manual transmission.

In the torque converter in accordance with the present invention, when the clutch operating mechanism is put into the start mode, the disengaging clutch is engaged while the lock-up clutch is disengaged. As a result, torque transmitted to the power input front cover and the impeller is transmitted via fluid movement to the turbine and further transmitted to the disengaging clutch and to the manual transmission input shaft. In this situation, fluid transmission of torque enables the vehicle to start moving smoothly.

When the clutch operating mechanism switches to the drive mode, the disengaging clutch and the lock-up clutch are both engaged. Consequently, the torque of the power input front cover is transmitted to the manual transmission through the lock-up clutch, the elastic coupling mechanism and the disengaging clutch. In this situation, since the torque from the power input front cover is mechanically transmitted to the manual transmission input shaft, the vehicle operates with greater fuel efficiency. Further, the torque converter may be defined has having two sections, a power input mechanism and a power output mechanism, where the boundary between the two mechanisms is an elastic coupling element or spring element which absorbs vibration between the power input mechanism and the power output mechanism. In such a torque transmission mechanism, the turbine and its peripheral elements are components of the power output mechanism. Hence, a ratio of moment of inertia of the power output mechanism to the moment of inertia of the power input mechanism is increased compared with the prior art configurations. As a result, resonance frequency of the torque converter of the present invention is decreased to the idle revolution of the engine or under, and thus, occurrence of abnormal sound like clattering sounds and internal indistinct sound is reduced while the vehicle runs under normal operating conditions.

When the clutch operating mechanism enters the speed change mode, the disengaging clutch is disengaged. Consequently, the torque of the power input front cover is no longer transmitted to the manual transmission input shaft. In this situation, the driver can change gears manually.

In such a torque converter, the single clutch operating mechanism permits simultaneous operation of both the disengaging clutch and the lock-up clutch. Thus, an inner configuration of the torque converter is greatly simplified.

In another aspect of the present invention, a lock-up clutch of a torque converter includes a main body, an impeller fixed to an inner surface of the main body, a turbine mounted within the main body adjacent to the impeller for rotation with respect to the impeller, a lock-up clutch mechanism connected to the turbine for rotation therewith, and an undulated plate spring engageable with the lock-up clutch mechanism for absorbing vibration in response to engagement of the lock-up clutch mechanism.

Preferably, the lock-up clutch includes a piston element selectively engageable and disengagable with a front cover of the main body and the undulated plate spring is disposed between the piston element and turbine, allowing limited angular displacement therebetween.

Preferably, the undulated plate spring is disposed within a viscous fluid charged chamber formed on the piston element.

Preferably, the undulated plate spring is disposed within a viscous fluid charged chamber formed on a front cover of the main body.

Preferably, the undulated plate spring is formed with a plurality of arcuate portions and a plurality of lever portions which alternate and are unitarily formed, and alternating pairs of the lever portions are provided with a hole for viscous fluid passage.

Preferably, the lock-up clutch further includes a weight element disposed between a front cover of the main body and the turbine, a piston element coupled to the turbine, the piston element configured for coupling and uncoupling from the weight element, a hydraulic pressure control device controlling hydraulic pressure within the main body for controlling coupling and uncoupling of the piston element from the weight element, and the undulated plate spring elastically coupling the weight element with the front cover in circular directions.

In still another aspect of the present invention, the lock-up clutch includes a main body, an impeller fixed to an inner surface of the main body, a turbine mounted within the main body adjacent to the impeller for rotation with respect to the impeller, a lock-up clutch mechanism connected to the turbine, a spring coupled to the lock-up clutch mechanism for absorbing vibration in response to engagement of the lock-up clutch mechanism, a weight element disposed between a front cover of the main body and the turbine, a piston element coupled to the turbine, the piston element configured for coupling and uncoupling from the weight element, a hydraulic pressure control device controlling hydraulic pressure within the main body for controlling coupling and uncoupling of the piston element from the weight element, and the spring elastically coupling the weight element with the front cover in circular directions.

Preferably, the spring is a coil spring.

However, it is more preferable for the spring to be an elongated undulated spring.

In the lock-up clutch according to the present invention, torque from the front cover is transmitted to the power output element through the undulated plate spring. Since the undulated plate spring is downsized in width compared with the coil spring, the lock-up clutch as a whole can be downsized in axial directions.

In the event that the torque converter further includes the piston element and the power output plate, torque transmission is selectively performed since engagement and disengagement of the piston element allows the piston element to be in selective contact with the front cover, the torque is transmitted to the power output element through the piston element, the undulated plate spring and the power output plate when the piston element is in contact with the front cover.

In the event that the torque converter further includes the viscous fluid charged chamber, since the undulated plate spring is compressed within the viscous fluid charged chamber, compression of the undulated plate spring causes viscous fluid to pass through a clearance gap between the undulated plate spring and the viscous fluid charged chamber, and a specified level of viscous resistance is developed. Thus, the viscous fluid charged chamber and the undulated plate spring implement functions performed by both an elastic coupling mechanism and a friction resistance generating mechanism in the prior art, and the resultant device is further downsized.

In the event that the undulated plate spring is provided in part with a hole through which the viscous fluid can pass, the viscous fluid in a closed space defined by the viscous fluid charged chamber and the undulated plate spring flows out through the hole when the undulated plate spring is contracted. Hence, the undulated plate spring, when contracted, is prevented from being deformed in radial directions, and the closed space can be retained. Thus, the clearance gap between the undulated plate spring and the viscous fluid charged chamber can be retained at a predetermined distance, and a high level of viscous resistance can be attained.

In the event that the torque converter includes a weight element, piston element, and a hydraulic pressure control device, torque transmission via the lock-up clutch is disengaged while the piston element is detached from the weight element because of hydraulic pressure control within the torque converter by the hydraulic pressure control device. In this situation, since the weight element is coupled to the front cover through the elastic element, it functions as a dynamic damper to effectively dampen vibration of the front cover and its peripherals. When the piston element is coupled to the weight element because of the hydraulic pressure control within the torque converter by the hydraulic pressure control device, torque of the front cover is transmitted to the power output element through the undulated plate spring, the weight element and the piston element. Torsional vibration transmitted from the front cover and its peripherals can be dampened by contraction of the undulated plate spring in circular directions. Especially, since the weight element causes a ratio of moment of inertia of a power output mechanism to a power input mechanism to be increased when the lock-up clutch is engaged, resonance frequency is reduced to the idle speed of the engine or lower in a power transmission system including the torque converter. This is useful to reduce the occurrence of abnormal sound like clattering sound and internal indistinct sound. In such a lock-up clutch, since the hydraulic pressure control enables the lock-up clutch to be engaged and disengaged and the weight element to be coupled and released, accurate control is attained.

In the event that the torque converter further includes a weight element, a piston element, a power output plate and the hydraulic pressure control device, when the hydraulic pressure control device controls hydraulic pressure within the torque converter, the piston element moves in axial directions and may be engaged with or disengaged from the power output plate. When disengaged, the weight element is not coupled to either of the power input or output mechanism. When the piston element is engaged by hydraulic pressure control within the torque converter by the hydraulic pressure control device, the power output plate is held by and between the weight element and the piston element. As a result, torque of the front cover is transmitted to the power output plate through the elastic element and then is applied to the power output element. Under the condition, the weight element causes a ratio of moment of inertia or the power output mechanism to the power input mechanism to be increased. In consequence, resonance frequency can be reduced to the idle speed of the engine or under in a power transmission system including the torque converter, and this reduces the occurrence of abnormal sound like clattering sound and internal indistinct sound in the transmission.

In the event that the torque converter further includes a weight element, an elastic element, a piston element and a power output plate, the lock-up clutch does not transmit torque when the piston element is detached from the power output plate. In this situation, the weight element functions as a dynamic damper against the front cover with the elastic element intervening between them. This allows vibration in the engine to be dampened. When the hydraulic pressure control device controls hydraulic pressure within the torque converter, the piston element moves in axial directions, and the power output plate is held by and between the piston element and the weight element. This results in torque being transmitted in parallel from the elastic element and the undulated plate spring to the power output plate. Under the condition, the weight element functions as part of a power output mechanism. Specifically, when the clutch is engaged, a ratio of moment of inertia of the power output mechanism to moment of inertia of a power input mechanism becomes greater, and consequently, resonance frequency shifts to a low revolution area, so that occurrence of abnormal sound like internal indistinct sound in the transmission is reduced.

In yet another aspect of the present invention, a lock-up clutch of a torque converter for transmitting torque includes a main body having a front cover and an impeller formed on an inner surface thereof, a turbine mounted for rotation within the main body adjacent to the impeller, a weight element disposed between the front cover and the turbine for rotation with respect to the front cover, an elastic element coupling the weight element with the front cover such that the weight element has limited angular displacement with respect to the front cover, a power output element connected to the turbine, a piston element mounted for rotation with the front cover and configured for axial movement with respect to the front cover, the piston element extending between the power output element and the turbine, and a hydraulic pressure control device controlling hydraulic pressure within at least two annular portions of the main body, the piston being moveable in axial directions in response to control of hydraulic pressure, the weight element being engageable and disengagable from the piston element in response to movement of the piston element.

Preferably, the elastic element is an elongated undulated spring.

Preferably, the elongated undulated spring is disposed in a viscous fluid charged chamber formed on the piston element.

Preferably, the undulated plate spring is formed with a plurality of holes through which viscous fluid passes.

Preferably, the elongated undulated spring includes a plurality of arcuate elements and a plurality of lever elements formed unitarily and alternating.

However, the elastic element may also be a coil spring.

In yet another aspect of the present invention a lock-up clutch of a torque converter for transmitting torque, includes a main body having a front cover and an impeller formed on an inner surface thereof, a turbine mounted for rotation within the main body adjacent to the impeller, a weight element disposed between the front cover and the turbine, a piston element coupled to the weight element for rotation therewith but configured for axial movement with respect to the weight, an elastic element elastically coupling the piston element with the front cover allowing limited rotary displacement between the piston element and the front cover, a power output plate extending between the weight element and the piston element and coupled to the turbine, and a hydraulic pressure control device for controlling hydraulic pressure within the torque converter, the piston element moving axially in response to changes in hydraulic pressure.

The elastic element may be a coil spring.

In the lock-up clutch according to the present invention, torque transmission by the lock-up clutch is disengaged when the piston element is disengaged from the weight element because of hydraulic pressure control within the torque converter by the hydraulic pressure control device. In this situation, since the weight element is coupled to the front cover through the elastic element, it functions as a dynamic damper to dampen vibration in the front cover and its peripheral components.

When the hydraulic pressure control within the torque converter by the hydraulic pressure control device causes the piston element to be coupled to the weight element, torque of the front cover is transmitted to the power output element through the elastic element, the weight element and the piston. Torsional vibration transmitted from the front cover is dampened by compression in circular directions of the elastic element. Since especially the weight element causes a ratio of moment of inertia of the power output mechanism to moment of inertia of the power input mechanism to increase while the lock-up clutch is engaged, resonance frequency is reduced to the idle speed of the engine or under in a power transmission system including the torque converter. This reduces the occurrence of abnormal sound like clattering sound and internal indistinct sound developed in the transmission.

In such a lock-up clutch, since the hydraulic pressure control allows the lock-up clutch to be engaged and disengaged and the weight element to be coupled and released, accurate control can be attained.

In the lock-up clutch of the present invention, when hydraulic pressure control within the torque converter by the hydraulic pressure control device causes the piston element to be released from the weight element, torque transmission by the lock-up clutch is disengaged. In this situation, since the weight element is coupled to the front cover through the elastic element, it functions as a dynamic damper to effectively dampen vibration in the front cover and its peripheral components.

When the hydraulic pressure control within the torque converter by the hydraulic pressure control device allows the piston element to press the power output plate against the weight element, torque of the front cover is transmitted to the power output element through the elastic element, the piston, and the power output plate. Torsional vibration transmitted from the front cover is dampened by compression in the circular directions of the elastic element. Since especially the weight element causes a ratio of moment of inertia of the power output mechanism to increase while the lock-up clutch is engaged, resonance frequency is reduced to the idle speed of the engine or under in a power transmission system including the torque converter. Consequently, this is effective to avoid occurrence of abnormal sound like internal indistinct sound and clattering sound developed in the transmission.

In such a lock-up clutch, since the torque transmission is performed on opposite sides of the power output plate, surface pressure is reduced if capacities of the torque transmission are the same, and abrasion of the power output plate is prevented to some extent.

In the event that the second elastic element is formed of a undulated plate spring, the undulated plate spring can be diminished in width compared with the coil spring, and therefore, the look-up clutch as a whole can be downsized in axial directions.

In the event that the torque converter further includes a viscous fluid charged chamber, since the undulated plate spring compresses within the viscous fluid charged chamber, compression of the undulated plate spring causes viscous fluid to pass through a clearance gap between the undulated plate spring and the viscous fluid charged chamber, and a specified level of viscous resistance is developed. Thus, the viscous fluid charged chamber and the undulated plate spring can implement functions of both an elastic coupling mechanism and a friction resistance generating mechanism in the prior art, and therefore, the resultant device can be further downsized with a possible reduction in the number of parts.

In the event that the undulated plate spring is provided in part with a hole through which the viscous fluid can pass, when the undulated plate spring is compressed, the viscous fluid in a closed space defined by and between the viscous fluid charged chamber and the undulated plate spring flows out through the hole. Hence, the undulated plate spring is prevented from being transformed in radial directions when contracted, and the closed space can be retained. Thus, a predetermined clearance gap defined by and between portions of the undulated plate spring and the viscous fluid charged chamber can be retained as it is predetermined, and a greater level of viscous resistance can be obtained.

In accordance with yet another aspect of the present invention a lock-up clutch of a torque converter for transmitting torque includes a main body having a front cover and an impeller formed on an inner surface thereof, a turbine mounted for rotation within the main body adjacent to the impeller, a weight element disposed between the front cover and the turbine, the weight configured for rotation with respect to the front cover, a friction disc element connected to the turbine for rotation therewith, a piston element supported on the friction disc element for rotation with respect thereto, the piston element being moveable axially with respect to the disc element, an elastic element coupling the piston element with the front cover in circular directions, and a hydraulic pressure control device for controlling hydraulic pressure within the torque converter, the piston element moveable in axial directions in response to hydraulic pressure changes to engage and disengage the friction disc element and the weight.

Preferably, the elastic element is formed of a undulated ribbon-like plate spring.

Preferably, a viscous fluid charged chamber is formed on the piston, the undulated ribbon-like plate spring being disposed therein.

Preferably, a portion of the undulated ribbon-like plate spring is provided with a hole through which viscous fluid passes.

Preferably, the undulated ribbon-like plate spring includes a plurality of arcuate elements and lever elements formed unitarily in alternating succession.

In a lock-up clutch according to the present invention, when a hydraulic pressure control device controls hydraulic pressure within a torque converter, the piston element is moved in axial directions and is disengaged from a power output plate. In this situation, a weight element is coupled to neither a power input mechanism nor a power output mechanism, as defined above.

When hydraulic pressure control within the torque converter by the hydraulic pressure control device causes the piston element to move in axial directions, the power output plate is held by and between the weight element and the piston element. Consequently, torque of the front cover is transmitted to the power output plate through an elastic element and further applied to a power output element. In this situation, the weight element increases a ratio of moment of inertia of the power output mechanism to a moment of inertia of the power input mechanism. As a result, resonance frequency in a power transmission system including the torque converter can be reduced to the idle speed of an engine or under, and this is useful for reducing occurrence of abnormal sound like clattering sound and internal indistinct sound in the transmission.

Since, especially in this lock-up clutch, the hydraulic pressure control permits the lock-up clutch to be engaged and disengaged and the weight element to be coupled and released, accurate control can be performed.

In the event that the second elastic element is formed of a undulated ribbon-like plate spring, since the undulated ribbon-like plate spring can be downsized in width compared with a coil spring, the lock-up clutch as a whole can be downsized in axial directions.

In the event that the torque converter further includes a viscous fluid charged chamber, the undulated ribbon-like plate spring expands and contracts within the viscous fluid charged chamber, contraction of the undulated ribbon-like plate spring causes viscous fluid to pass through a predetermined clearance gap between the undulated ribbon-like plate spring and the viscous fluid charged chamber, and a specified level of viscous resistance is developed. The viscous fluid charged chamber and the undulated ribbon-like plate spring can implement functions of both an elastic coupling mechanism and a friction resistance generating mechanism common to prior art configurations, and the resultant torque converter can be further downsized with a possible reduction in the number of parts.

In the event that the undulated ribbon-like plate spring is provided in part with a hole through which viscous fluid can pass, the viscous fluid in a closed space defined by and between the viscous fluid charged chamber and the undulated ribbon-like plate spring flows out through the hole when the undulated ribbon-like plate spring is contracted. This prevents the undulated ribbon-like plate spring from being transformed in radial directions while the undulated ribbon-like plate spring is contracted, and the closed space can be retained. Thus, the clearance gap between the undulated ribbon-like plate spring and the viscous fluid charged chamber can be retained as it is predetermined, and a larger level of viscous resistance can be obtained.

In accordance with another aspect of the present invention, a lock-up clutch of a torque converter for transmitting torque includes a main body having a front cover and an impeller formed on an inner surface thereof, a turbine mounted for rotation within the main body adjacent to the impeller, a weight element disposed between the front cover and the turbine, a first elastic element coupling the weight element with the front cover allowing limited angular displacement between the weight element and the first elastic element, a piston element disposed adjacent to the weight element configured for axial movement within the main body, a power output plate placed between the piston element and the weight element, the power output plate coupled to a manual transmission input shaft, a second elastic element between the piston element and the front cover allowing limited angular displacement therebetween, and a hydraulic pressure control device controlling hydraulic pressure within the main body, the piston element being moveable in axial directions in response to changes in hydraulic pressure within the main body.

Preferably, the second elastic element is formed of an undulated ribbon-like plate spring.

Preferably, the piston element further includes a viscous fluid charged chamber which houses the undulated ribbon-like plate spring.

Preferably, a portion of the undulated ribbon-like plate spring is provided with a hole through which viscous fluid may pass.

Preferably, the undulated ribbon-like plate spring is includes a plurality of spring elements connected in series, each of the spring elements having an arcuate portion and a pair of levers extending from ends the arcuate portion.

However, the second elastic element might also be a coil spring.

In a lock-up clutch of a torque converter according to the present invention, when a piston element is released from a power output plate, the lock-up clutch no longer transmit torque. In this situation, a weight element functions as a dynamic damper against the front cover through the first elastic element to dampen vibration in the engine.

When a hydraulic pressure control device controls hydraulic pressure within the torque converter, the piston element moves in axial directions, so that the power output plate is held by and between the piston element and the weight element. This permits torque to be transmitted in parallel from the first and second elastic elements to the power Output plate. Under this condition, the weight element functions as part of a power output mechanism. Specifically, during engagement of the clutch, a ratio of moment of inertia of the power output mechanism to moment of inertia of a power input mechanism is increased. In consequence, resonance frequency shifts to a region of low revolution speed, and occurrence of abnormal sound like internal indistinct sound in the transmission is reduced.

In this lock-up clutch, the piston element is moved in axial directions by the hydraulic pressure control device, and therefore, accurate control can be performed.

In the event that the second elastic element is formed of a undulated ribbon-like plate spring, since the undulated ribbon-like plate spring can be downsized in width compared with a coil spring, the lock-up clutch as a whole can be downsized in axial directions.

In the event that the torque converter further includes a viscous fluid charged chamber, since the undulated ribbon-like plate spring is compressed within the viscous fluid chamber, contraction of the undulated ribbon-like plate spring causes the viscous fluid to pass through a gap defined by and between the undulated ribbon-like plate spring and the viscous fluid chamber, so that a certain level of viscous resistance is developed. Thus, the viscous fluid chamber and the undulated ribbon-like plate spring can implement functions of both an elastic coupling mechanism and a friction resistance generating mechanism. The elastic coupling mechanism and friction resistance generating mechanism are common in the prior art prior art configurations. As a result present invention configuration, the resultant torque converter can be further downsized.

In the event that the undulated ribbon-like plate spring is provided in part with a hole through which the viscous fluid can pass, the viscous fluid in a closed space defined between the viscous fluid charged chamber and the undulated ribbon-like plate spring flows out through the hole when the curved plate spring is contracted. This prevents the undulated ribbon-like plate spring from being transformed in radial directions when the undulated ribbon-like plate spring is contracted, and the closed space can be retained. Thus, the gap between the undulated ribbon-like plate spring and the viscous fluid charged chamber can be retained as it is predetermined, and a greater level of viscous resistance can be obtained.

These and other objects, features, aspects and advantages of the present invention will become more fully apparent from the following detailed description of the present invention when taken in conjunction with the accompanying drawings where like reference numerals denote corresponding parts throughout, in which:

DETAILED DESCRIPTION OF THE PREFERRED EMBODIMENT

Embodiment 1

Figure 1:
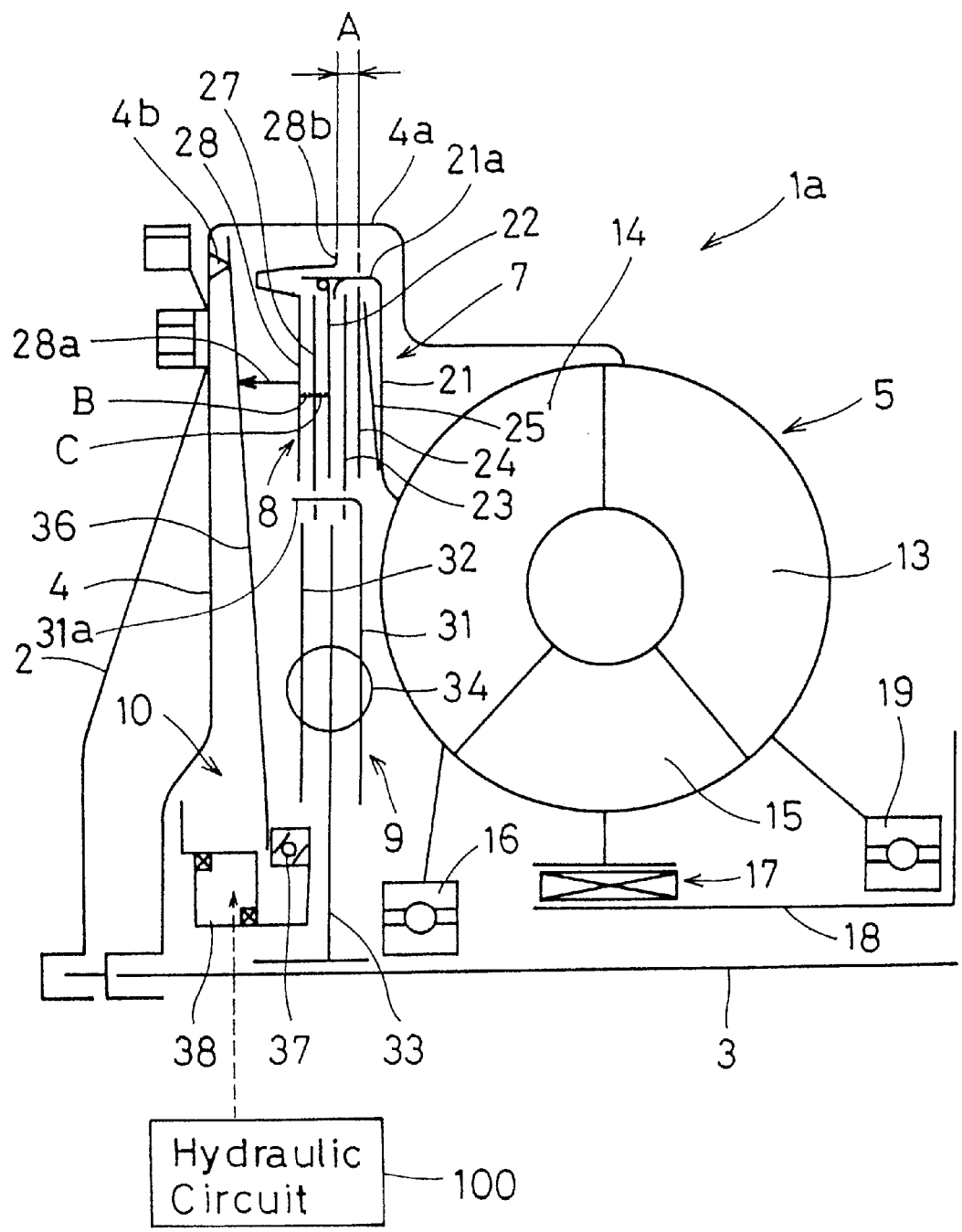
FIG. 1 is a fragmentary schematic side view showing some of the internal components a torque converter in accordance with a first embodiment of the present invention.

FIG. 1 is a schematic side view showing a torque converter 1a in a first embodiment of the present invention. The torque converter 1a is a mechanism for transmitting torque from a flexible plate 2 coupled to a crank shaft (not shown) in an engine (not shown) to a main drive shaft 3 of a manual transmission (not shown). The engine is positioned to the left in FIG. 1, while the manual transmission is positioned to the right in FIG. 1.

The torque converter 1a primarily includes a front cover 4, a torque converter main body 5, a disengaging clutch 7, a lock-up clutch 8, an elastic coupling mechanism 9 and a hydraulic operating device 10.

The front cover 4 is fixed to the flexible plate 2.

The torque converter main body 5 includes three types of turbine elements, namely, an impeller 13, a turbine 14 and a stator 15. The impeller 13 is fixed to an outer circumferential tubular portion 4a of the front cover 4 and defines a hydraulic oil chamber along with the front cover 4. The turbine 14 is positioned opposite to the impeller 13 within the hydraulic oil chamber. The turbine 14 is rotatably supported by the main drive shaft 3 through a first bearing 16. The stator 15 is placed between inner circumferences of the impeller 13 and the turbine 14 and is supported by a fixed shaft 18 via a one-way clutch mechanism 17. The impeller 13 is also rotatably supported on the fixed shaft 18 through a second bearing 19.

The disengaging clutch 7, the lock-up clutch 8, the elastic coupling mechanism 9 and the hydraulic operating device 10 are disposed in a space defined between the front cover 4 and the turbine 14 within the hydraulic oil chamber of the torque converter 1a.

The disengaging clutch 7 is primarily includes a fixed element 21 fixed to a back surface of the turbine 14, a load applying plate 22, a first power output plate 23, a first power input plate 24 and a cone spring 25. The fixed element 21 is a ring-shaped element and has its inner circumferential end fixed to the back surface of the turbine 14 and its outer circumferential end having a cylindrical shape and referred hereinafter as a tube 21a which extends toward the front cover 2. The load applying plate 22 engages the tube 21a so as to rotate therewith but is confined so as not to move in axial directions relative to the tube 21a. The first power output plate 23, the first power input plate 24 and the cone spring 25 are arranged in order between the fixed element 21 and the load applying plate 22. The first power output plate 23 has its inner circumferential end coupled to the elastic coupling mechanism 9, as described in greater detail below. The first power input plate 24 has its outer circumferential end engaged with the tube 21a so as to rotate therewith but is able to move in axial directions with respect to the tube 21a. Part of the first power input plate 24 protrudes outward beyond the tube 21a through, for example, a slit (not shown) formed therein. The cone spring 25 is biased to urge the first power input plate 24 in a direction toward the flexible plate 2.

The lock-up clutch 8 primarily includes the load applying plate 22 and a second power output plate 27. The second power output plate 27 is positioned adjacent to the load applying plate 22 as shown in FIG. 1, and has its inner circumferential end coupled to the elastic coupling mechanism 9.

The elastic coupling mechanism 9 includes an engaging plate 31, a supporting plate 32, a power output plate 33 and a plurality of coil springs 34. The engaging plate 31 is provided with a tubular portion 31a in its outer circumferential portion, and inner circumferential portions of the first power output plate 23 and second power output plate 27 engage with the tubular portion 31a so as to rotate therewith but is able to move in axial directions relative to the tubular portion 31a. The engaging plate 31 and the supporting plate 32 are opposed to each other in axial directions, and an outer circumferential portion of the power output plate 33 is positioned between the plates 31 and 32. The engaging plate 31, the supporting plate 32 and the power output plate 33 are elastically coupled to one another in circular directions through coil springs 34. The power output plate 33 has its inner circumferential end in spline engagement with the main drive shaft 3.

The hydraulic operating device 10 primarily includes a pressure plate 28, a diaphragm spring 36, a release bearing 37 and a hydraulic operating chamber 38. The pressure plate 28 is positioned adjacent to the second power output plate 27 close to the front cover 2 and provided with an annular projecting portion 28a on an opposite side from the second power output plate 27.

The pressure plate 28 has its outer circumferential portion fixed to the outer circumferential tubular portion 4a of the front cover 4 by, for instance, strap plates (not shown) so as to rotate therewith but is able to move in axial directions, The pressure plate 28 is urged toward the engine by the strap plates (not shown). In an outer circumferential portion of the pressure plate 28, a pusher 28b is formed which is axially aligned with the part of the first power input plate 24 which protrudes beyond the tube 21a. The diaphragm spring 36 has its outer circumferential end supported by an annular supporting portion 4b formed in the front cover 4. The intermediate portion in radial directions of the spring 36 engages and urges the projecting portion 28a of the pressure plate 28 toward the turbine 14. The release bearing 37 is positioned at an inner circumferential end of the diaphragm spring 36. The release bearing 37 is fixed to a moveable portion extending from the hydraulic operating chamber 38. Hydraulic pressure within the hydraulic operating chamber 38 is controlled by a hydraulic operating circuit 100.

The operation of the torque converter will now be described.

Start Mode

In a start-up mode, hydraulic oil pressure in the hydraulic operating chamber 38 is controlled by the hydraulic circuit 100 to move the release bearing 37 to a position close to the front cover 4. The movement of the release bearing 37 causes an inner circumferential end of the diaphragm spring 36 to move toward the front cover 4 to release the pressure plate 29 from the urging force exerted by the diaphragm spring 36. In this situation, the pressure plate 28 is urged by the strap plates (not shown) to a first position close to the front cover 4. In this condition, a clearance gap A is established between the pusher 28b of the pressure plate 28 and the outer circumferential portion of the first power input plate 24 causing the disengaging clutch 7 to be engaged. When the clearance gap A is established, the urging force of the cone spring 25 allows the first power output plate 23 and the first power input plate 24 to be in press-contact with the load applying plate 22, and the turbine 4 and the elastic coupling mechanism 9 are coupled to each other. In the lock-up clutch 8, a clearance gap B is established between the pressure plate 28 and the second power output plate 27 while a clearance gap C is established between the second power output plate 27 and the load applying plate 22, and the lock-up clutch 8 is disengaged. When the lock-up clutch 8 is disengaged, and the disengaging clutch 7 is engaged, the gaps A, B and C have the following relationship: B+C>A.

When the lock-up clutch 8 is disengaged, and the disengaging clutch 7 is engaged, torque from the crank shaft (not shown) is transmitted to the front cover 4 through the flexible plate 2. The flexible plate 2 absorbs bending vibration of the torque. The impeller 13 rotates along with the front cover 4, the hydraulic oil within the torque converter main body 5 flows from the impeller 13 toward the turbine 14, and the turbine 14 rotates. The torque of the turbine 14 is transmitted to the elastic coupling mechanism 9 through the disengaging clutch 7. The torque is applied from the elastic coupling mechanism 9 to the main drive shaft 3 and further transmitted to the manual transmission (not shown). The torsional vibration of the torque is dampened in the elastic coupling mechanism 9.

Hence, in the start mode, torque is transmitted primarily by fluid movement in the torque converter main body 5 and the vehicle equipped with the present invention starts moving smoothly in a manner similar to movement in a vehicle equipped with an automatic transmission and corresponding torque converter.

Drive Mode

In a drive mode, a predetermined level of hydraulic pressure is supplied to the hydraulic operating chamber 38 from the hydraulic circuit 100 to move the release bearing 37 to a drive mode position (not shown) where the diaphragm spring 36 moves to an intermediate position closer to the turbine 14 than in the start mode described above. In the drive mode position, the diaphragm spring 36 pushes the pressure plate 28 toward the turbine 14, the pusher 28b of the pressure plate 28 moves the outer circumferential portion of the first power input plate 24 against the pushing force of the cone spring 25, and the pressure plate 28 causes the second power output plate 27 to be in press-contact with the load applying plate 22. Thus, the disengaging clutch 7 is disengaged and the lock-up clutch 8 is engaged. In this situation, the pushing force of the diaphragm spring 36 is transmitted to the turbine through the load applying plate 22 and the fixed element 21.

With the disengaging clutch 7 disengaged and the lock-up clutch 8 engaged, torque from the front cover 4 is applied to the main drive shaft 3 through the lock-up clutch B and the elastic coupling mechanism 9. In the drive mode, the torque from the front cover 4 is transmitted mechanically to the manual transmission (not shown) without the use of the torque converter main body 5, and hence, the vehicle runs with greater fuel efficiency.

Speed Change Mode

In a speed change mode, a predetermined level of hydraulic pressure is supplied to the hydraulic operating chamber 38, and the release bearing 37 is moved to a position between the start mode position and the drive mode position. This allows the inner circumferential end of the diaphragm spring 36 to move part way back toward the front cover 4 (but not as far as the start mode position). In this situation, the pressure plate 29 is displaced toward the transmission by a distance D (A<D<(B+C)) from a position where it is in the start mode. It should be noted that the distance D is only defined but is not shown in the figures. Under this condition, although the pusher 28b of the pressure plate 28 continues to cause the outer circumferential end of the first power input plate 24 to move slightly toward the turbine 14, a small clearance gap is retained between the pressure plate 28 and the second power output plate 27 and the load applying plate 22; that is, both the lock-up clutch 8 and the disengaging clutch 7 are disengaged. In such a circumstance, the torque is not transmitted from the front cover 4 to the main drive shaft 3, and the driver is able to change gears by using the manual transmission.

As has been described, the disengaging clutch 7 and the lock-up clutch 8 are operated simultaneously by the hydraulic operating device 10. Thus, two of the clutches are actuated by a single operating mechanism. This leads to a greatly simplified inner configuration of the torque converter 1. As will be recognized in the drawing, the disengaging clutch 7 and the lock-up clutch B are disposed side by side close to each other, and they are each engageable with load applying plate 22. Such an arrangement of the clutches disposed close to each other simplifies a structure of the related portion and makes the whole structure more compact.

Embodiment 2

Figure 2:
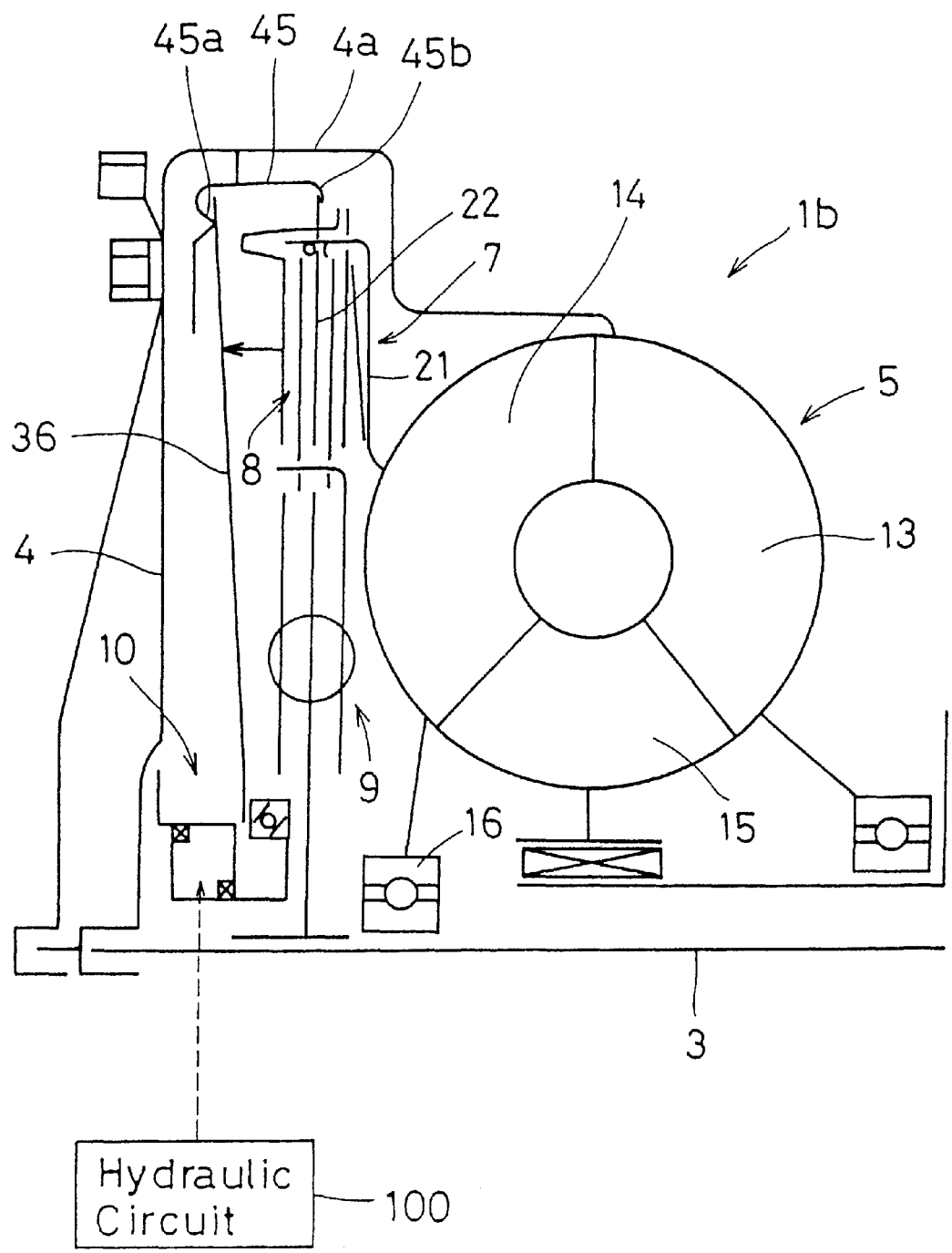
FIG. 2 is a schematic side view similar to FIG. 1, of a torque converter in accordance with a second embodiment of the present invention.

FIG. 2 is a schematic sectional view showing a torque converter 1b in a second embodiment of the present invention. Herein and in other embodiments of the present invention described below, there various components and elements common to several of the various embodiments. In order to eliminate repetition, explanation of the some of the previously described elements is omitted, and generally, only differing or reconfigured elements will be described.

The torque converter 1b in this embodiment is generally configured in a manner similar to the torque converter 1a in Embodiment 1. However, the hydraulic operating device 10 in the second embodiment includes a cover plate 45 covering an outer circumferential portion of a diaphragm spring 36 within the torque converter main body 5. The cover plate 45 has an annular supporter 45a supporting the outer circumferential portion of the diaphragm spring 36 close to the front cover 4. The cover plate 45 has its outer circumferential portion fixed to a tubular outer circumferential portion 4a of the front cover 4. Moreover, the cover plate 45 has an engaging portion 45b in contact with an outer circumferential portion of the load applying plate 22 close to the transmission. Thus, the cover plate 45 supports the outer circumferential portion of the diaphragm spring 36 and supports load in the lock-up clutch 8 applied from the diaphragm spring 36. Thus, the load in the lock-up clutch 8 applied from the diaphragm spring 36 no longer affect a turbine 14. As a consequence, the load applied to the turbine 14 is reduced compared to the first embodiment, and the load to the first bearing 16 supporting the turbine 14 is accordingly reduced, so that the functional life of the first bearing 16 may be extended.

Embodiment 3

Figure 3:
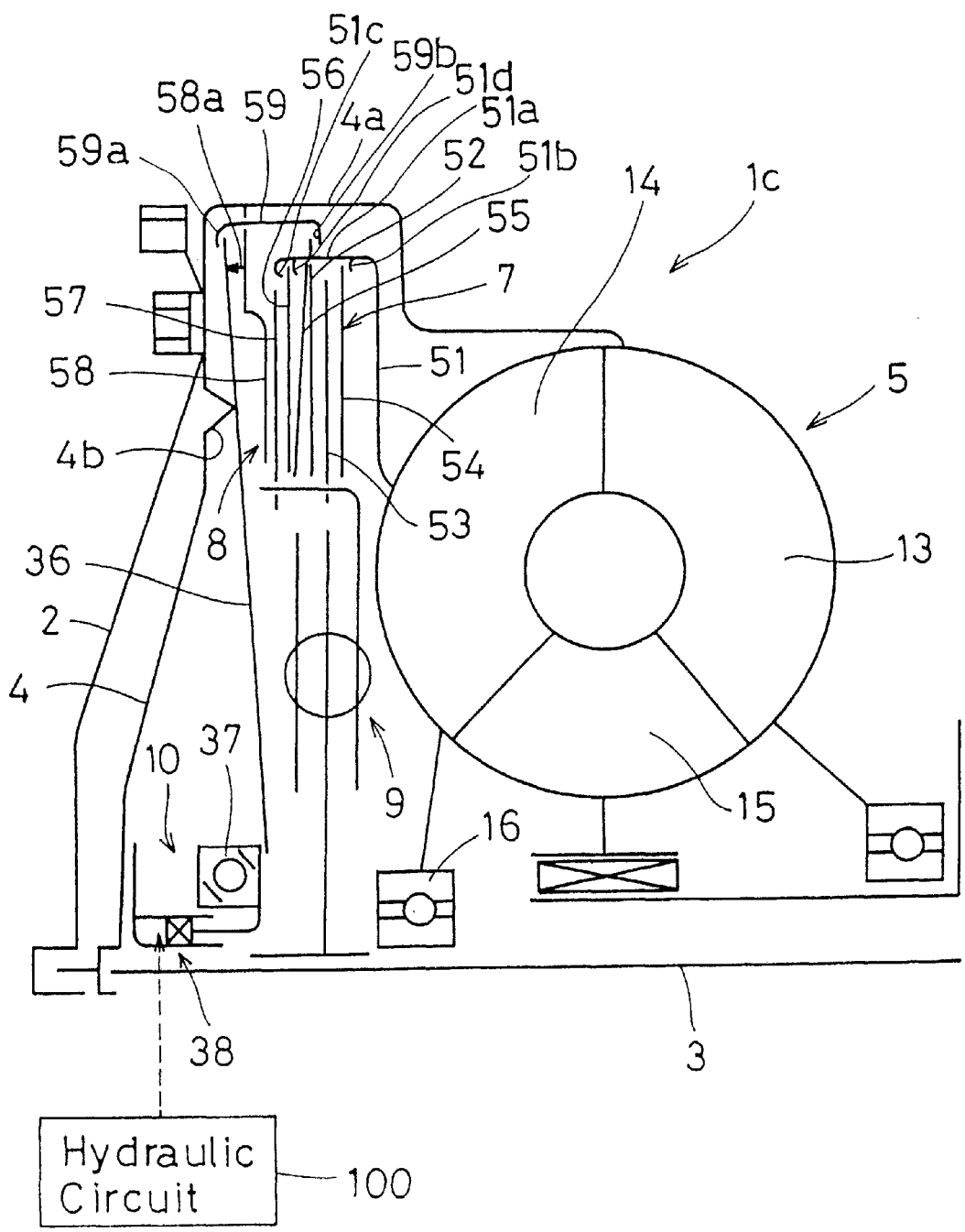
FIG. 3 is a schematic side view similar to FIG. 1, of a torque converter in accordance with a third embodiment of the present invention.

FIG. 3 is a schematic view showing a model of a torque converter 1c in accordance with a third embodiment of the present invention.

In the third embodiment, the disengaging clutch 7 primarily includes a fixed element 51, a first power input plate 52, a first power output plate 53, a first load applying plate 54, a cone spring 55, and a second load applying plate 56. The fixed element 51 is a ring-shaped element fixed to an outer circumference of a turbine 14 and is provided in an outer circumference with a tube 51a extending toward the front cover 4. The first load applying plate 54 has its outer circumferential portion put in contact with a restraining portion 51b formed inside the tube 51a and is thereby restrained from moving toward the turbine 14. The second load applying plate 56 is placed closer to the front cover 4 than the first load applying plate 54 and has its outer circumferential portion placed between a pair of restraining portions 51c and 51d of the tube 51a of the fixed element 51 so as to have limited movement in axial directions therebetween. Between the first load applying plate 54 and the second load applying plate 56, the first power output plate 53, the first power input plate 52 and the cone spring 55 are disposed in this order from a side close to the first load applying plate 54. The first power output plate 53 has its inner circumferential portion coupled to the elastic coupling mechanism 9. The first power input plate 52 has its outer circumferential portion engaged with the tube 51a so as to rotate therewith but may move in axial directions relative thereto. The outer circumferential portion of the first power input plate 52 partially protrudes outward beyond the tube 51a. The cone spring 55 is slightly compressed in position to urge the first power input plate 52 toward the turbine 14.

The lock-up clutch 8 is primarily includes the second load applying plate 56 and a second power output plate 57. The second power output plate 57 is placed in the second load applying plate 56 close to the engine and has its inner circumferential portion engaged with the elastic coupling mechanism 9 so as to rotate therewith but may move in axial directions via, for instance, slots (not shown).

The hydraulic operating device 10 includes a pressure plate 58, a diaphragm spring 36, a release bearing 37 and a hydraulic operating chamber 38. The pressure plate 58 is positioned adjacent to the second power output plate 57 close to the engine. The pressure plate 58 has its outer circumferential portion fixed to an outer circumferential tubular portion 4a of a front cover 4 through strap plates (not shown) so as to rotate therewith but may move in axial directions. The strap plates (not shown) urge the pressure plate 58 toward the front cover 4. An outer circumferential end of the diaphragm spring 36 is engageable with an annular projecting portion 58a of the pressure plate 58. An intermediate portion in radial directions of the diaphragm spring 36 is supported by an annular supporter 4b of the front cover 4. The diaphragm spring 36 has an inner circumferential end in contact with the release bearing 37. One end of the coupling plate 59 includes an inwardly extending portion 59a which contacts and restrain an outer circumferential edge of the diaphragm spring 36 while the other end 59b of the coupling plate 59 extend radially inwardly to be contactable with an outer circumferential end of the first power input plate 52.

In a start mode, the release bearing 37 causes an inner circumferential end of the diaphragm spring 36 to slightly move toward the turbine 14. Hence, the outer circumferential portion of the diaphragm spring 36 slightly moves toward the front cover 4. Thus, the pressure plate 58 is released from pushing force by the diaphragm spring 36, and the pressure plate 58 is urged toward the front cover 4 by the strap plates (not shown). In this situation, although the coupling plate 59 slightly moves toward the front cover 4 as the outer circumferential end of the diaphragm spring 36 moves, the end 59b does not come in contact with the outer circumferential portion of the first power input plate 52. As a result, the disengaging clutch 7 is engaged while the lock-up clutch 8 is disengaged.

To a drive mode, the release bearing 37 moves toward the front cover 4 in the drawing to release an inner circumferential end of the diaphragm spring 36 from the pushing force. Thus, the outer circumferential portion of the diaphragm spring 36 moves toward the turbine 14 to push the pressure plate 58. In consequence, the disengaging clutch 7 and the lock-up clutch 8 are engaged, In a speed change mode, the release bearing 37 moves to a position closest to the turbine 14 to move the inner circumferential end of the diaphragm spring 36 to a position closest to the turbine 14. This results in releasing the pressure plate 58 from being urged against second power output plate 57, and the lock-up clutch 8 is disengaged. The coupling plate 59 greatly moves toward the front cover 4 along with the outer circumferential end of the diaphragm spring 36. As a result, the end 59b of the coupling plate 59 close to the turbine 14 urges the outer circumferential end of the first power input plate 52 toward the front cover 4, and this, in turn, disengage the disengaging clutch 7.

Embodiment 4

Figure 4:
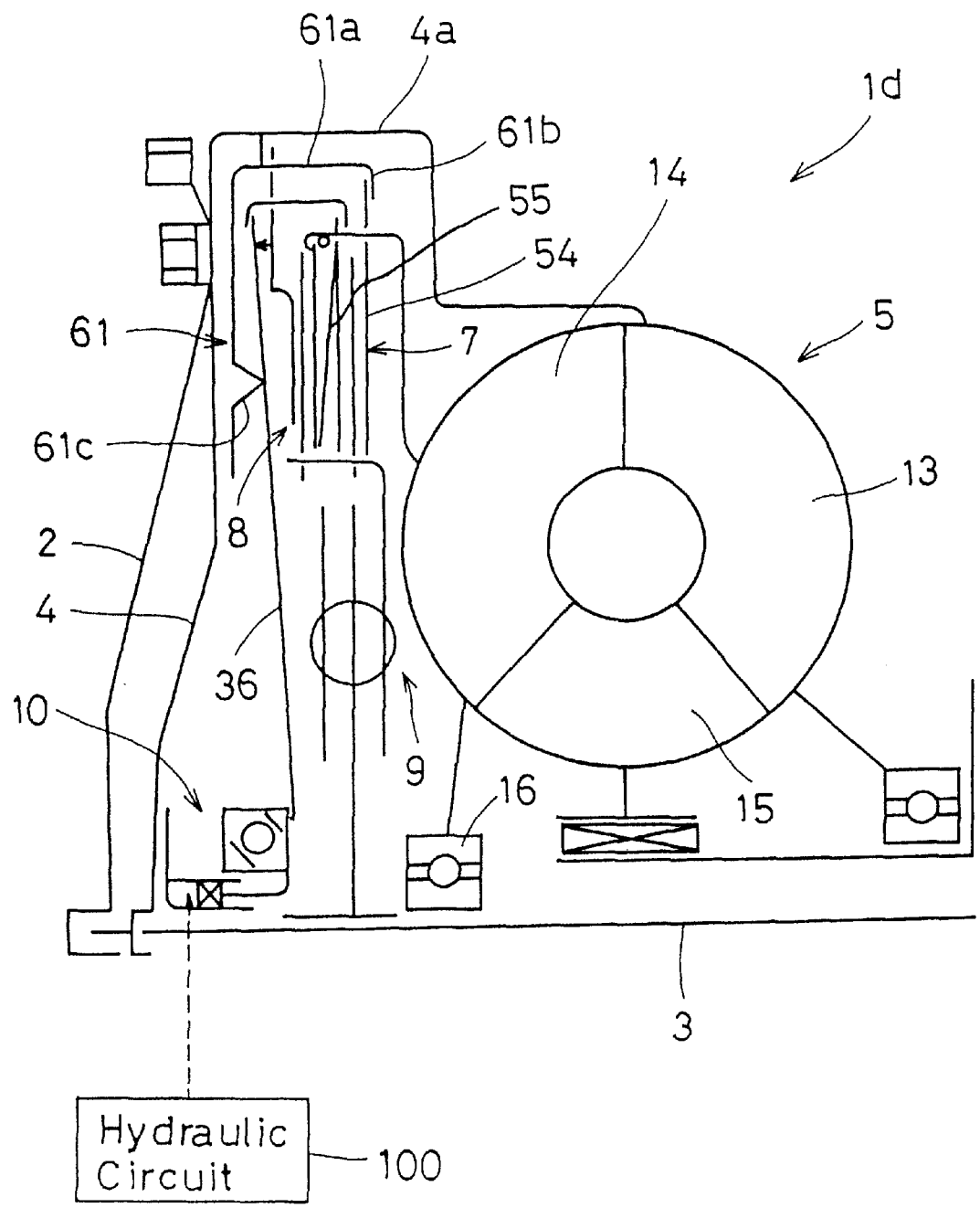
FIG. 4 is a schematic side view similar to FIG. 1, of a torque converter in accordance with a fourth embodiment of the present invention.

FIG. 4 is a schematic sectional view showing a torque converter 1d in accordance with a forth embodiment of the present invention. The torque converter 1 of this embodiment has a similar configuration to the torque converter 1c in Embodiment 3.

In the fourth embodiment, the hydraulic operating device 10 additionally includes a cover plate 61 covering an outer circumferential side of a diaphragm spring 36. The cover plate 61 is a ring-shaped element and has its outer circumferential portion fixed to an outer circumferential tubular portion 4a of a front cover 4. The cover plate 61 is formed with a tube 61a on its outer circumferential portion, the tube 61a extending toward the turbine 14, and an end of the tube 61a close to the turbine 14 is bent inward to make an engaging portion 61b which comes in contact with an outer circumferential portion of a first load applying plate 54 close to the turbine 14. In an inner circumference of the cover plate 61, an annular supporter 61c is formed for supporting an intermediate portion in radial directions of the diaphragm spring 36. In this embodiment, since load of a cone spring 55 is received by the cover plate 61, load on the turbine 14 is reduced. Load on a first bearing 16 supporting the turbine 14 is accordingly reduced, and the life expectancy of the first bearing 16 is possibly extended.

Embodiment 5

Figure 5:
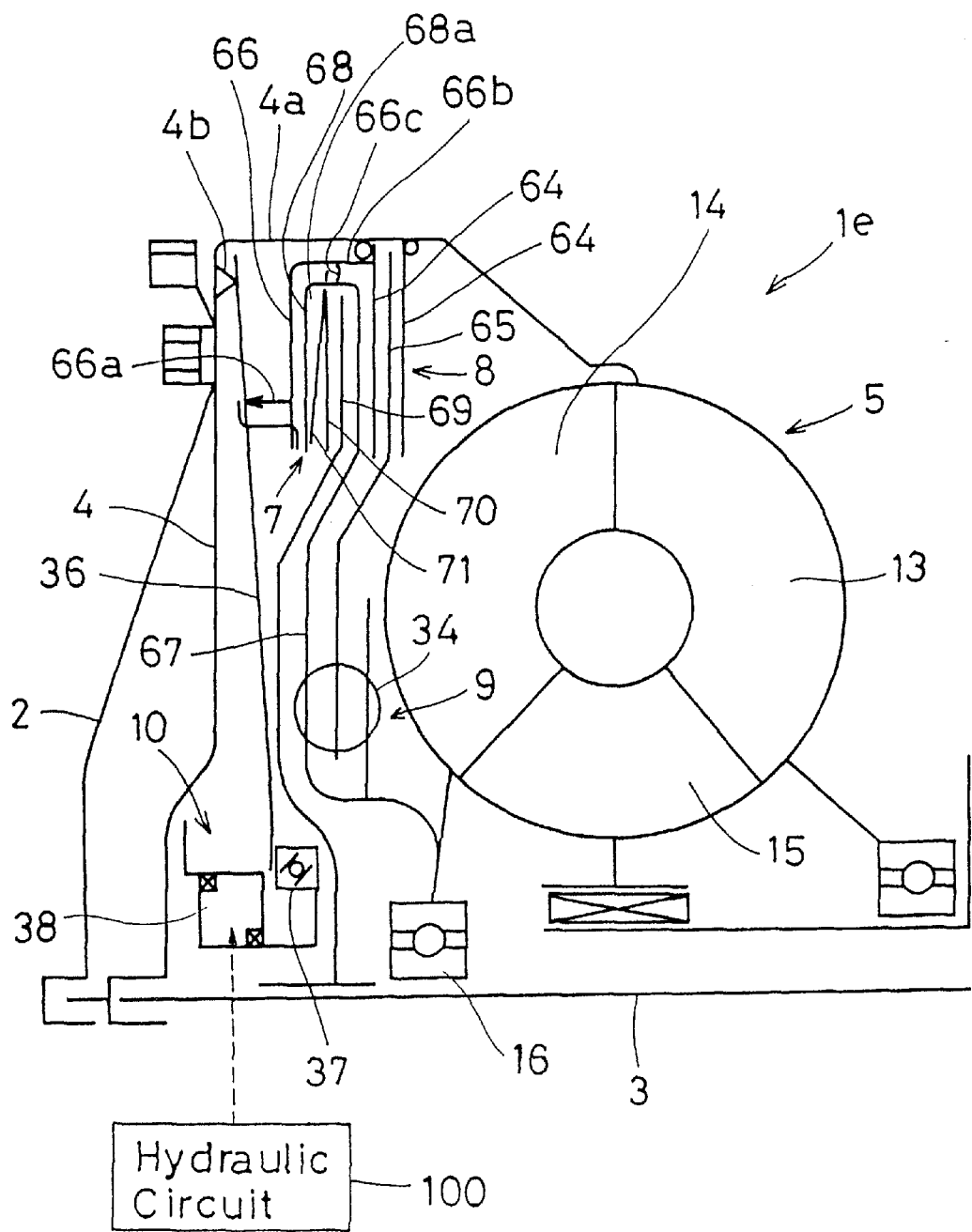
FIG. 5 is a schematic side view similar to FIG. 1, of a torque converter in accordance with a fifth embodiment of the present invention.
Figure 6:
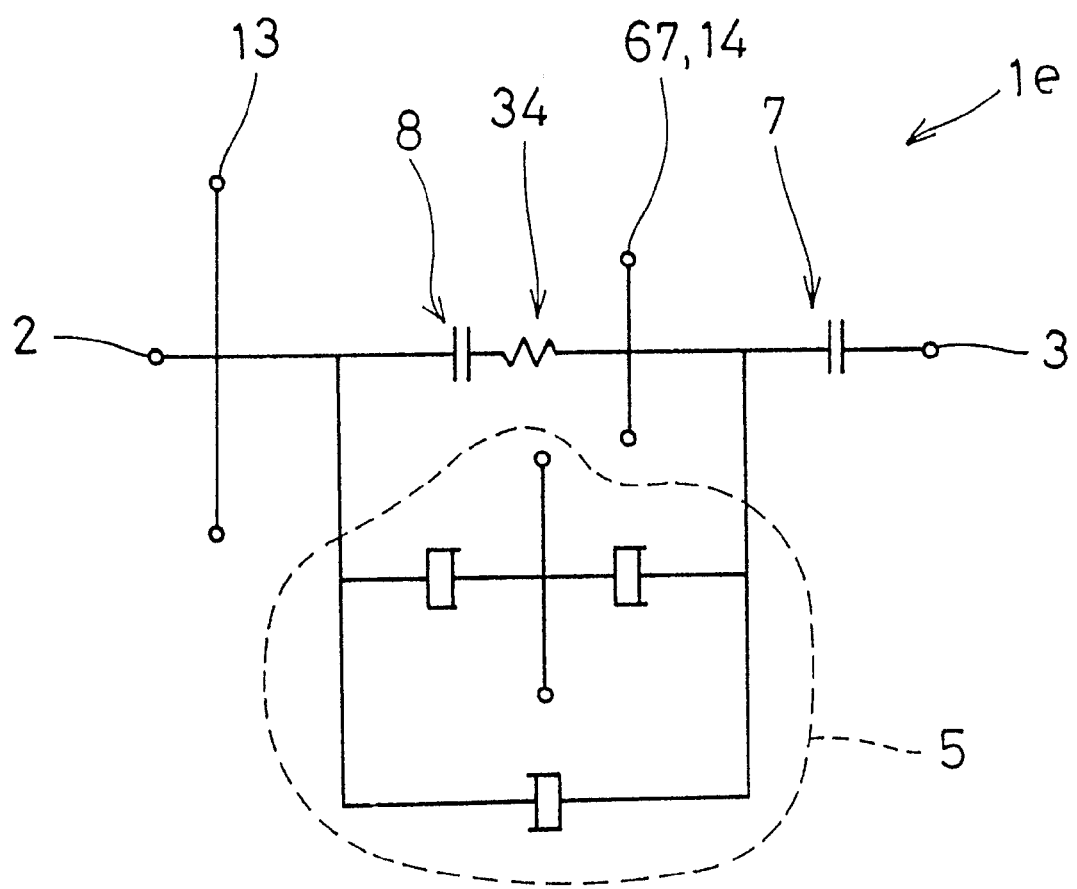
FIG. 6 is a force diagram showing a dynamic model of the torque converter depicted in FIG. 5.

FIG. 5 is a schematic sectional view showing a torque converter 1e according to a fifth embodiment of the present invention while FIG. 6 is a diagram showing a dynamic model of the same.

A fixed plate 67 is a disk-shaped element fixed to the turbine 14. The fixed plate 67 has its outer circumferential portion bent inward to make a supporter 68 defining an annular space 68a. The fixed plate 67 is rotatably supported by a main drive shaft 3 through a first bearing 16.

A disengaging clutch 7 primarily includes an outer circumferential portion of a power output plate 69 placed within the annular space 68a, a first power input plate 70, and a cone spring 71. An inner circumferential portion of the power output plate 69 is engaged in spline with the main drive shaft 3. Between the outer circumferential portion of the power output plate 69 and the supporter 68, the first power input plate 70 and the cone spring 71 are disposed in order from the power output plate 69. An outer circumferential portion of the first power input plate 70 engages with a tubular portion of the supporter 68 so as to rotate therewith but may move in axial directions. Part of the outer circumferential portion of the first power input plate 70 protrudes outward beyond the tubular portion of the supporter 68. The cone spring 71 is compressed in position to urge the first power input plate 70 toward the turbine 14.

The lock-up clutch 8 consists of two second power input plates 64 and a second power output plate 65. The second power input plates 64 are engaged with an outer circumferential tubular portion 4a of a front cover 4 so as to move in axial directions in a predetermined range but not to relatively rotate. An outer circumferential portion of the second power output plate 65 is positioned between the second power input plates 64. An inner circumferential end of the power output plate 69 is elastically coupled in circular directions to the fixed plate 67 through a plurality of coil springs 34.

The hydraulic operating device 10 includes the diaphragm spring 36, the release bearing 37, the hydraulic operating chamber 38 and the pressure plate 66. An outer circumferential end of the diaphragm spring 36 close to the front cover 4 is supported by an annular supporter 4b of the front cover 4, and its intermediate portion in radial directions comes in contact with an annular projection 66a of the pressure plate 66. The release bearing 37 is placed in an inner circumferential end of the diaphragm spring 36 close to the turbine 14. In an outer circumference of the pressure plate 66, there are formed a pusher 66b coming in contact with the second power input plate 64 and an engaging portion 66c placed in an outer circumferential end of the first power input plate 70 close to the turbine 14.

Hereinbelow, the torque converter 1e is defined as having two sections, a power input mechanism and a power output mechanism. The power input mechanism is defined as including at least the front cover 4, the impeller 13, and the lock up clutch 8. The power output mechanism includes at least the turbine 14, the fixed plates 67 and the disengaging clutch 7. The spring 34 divides the power input mechanism from the power output mechanism.

An operation of the torque converter will be described below.

In a start mode, the hydraulic circuit 100 controls the hydraulic pressure within the hydraulic operating chamber 38 to cause the release bearing 37 to move toward the front cover 4 to cause the inner circumferential end of the diaphragm spring 36 to move accordingly. In this situation, although the pusher 66b of the pressure plate 66 slightly pushes the second power input plate 64, the lock-up clutch 8 becomes disengaged, and the disengaging clutch 7 is engaged because the engaging portion 66c does not come in contact with the first power input plate 70. As a result, torque from the torque converter main body 5 is applied to the main drive shaft 3 through the disengaging clutch 7.

In a drive mode, the release bearing 37 is moved toward the turbine 14 to release the diaphragm spring 36 from the pushing force. This results in the diaphragm spring 36 pushing the pressure plate 66 toward the turbine 14. In such a position, the pusher 66b of the pressure plate 66 causes the second power input plate 64 toward the turbine 14, so that the lock-up clutch 8 becomes engaged. In this situation, as shown in FIG. 6, in the power input mechanism and the power output mechanism are divided by the coil springs 34 intervening between them, the turbine 14 and the fixed plate 67 function as elements for the power output mechanism. Specifically, in a torque transmitting system including the torque converter 1, a ratio of moment of inertia of the power output mechanism is sufficiently increased. Hence, resonance frequency is decreased to the idle speed of the engine (not shown) or lower, and occurrence of abnormal sound in the transmission (not shown) is reduced.

In a speed change mode, the release bearing 37 moves toward the front cover 4 to cause the inner circumferential end of the diaphragm spring 36 to accordingly move. In this situation, the pusher 66b of the pressure plate 66 is detached from the second power input plate 64, and the engaging portion 66c causes the first power input plate 70 to move toward the front cover 4. Thus, the disengaging clutch 7 and the lock-up clutch 8 become disengaged so as to change gears.

Embodiment 6

Figure 7:
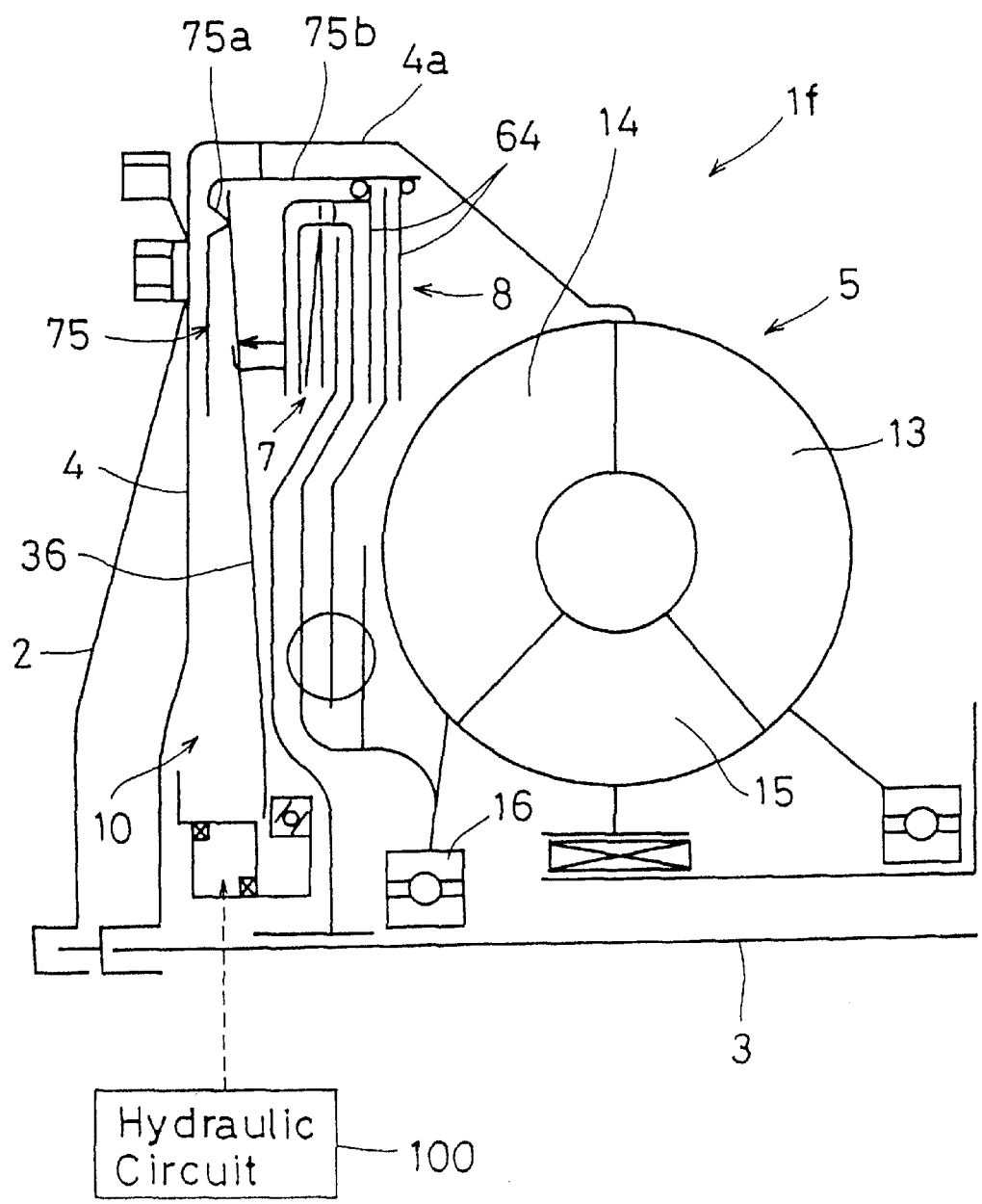
FIG. 7 is a schematic side view similar to FIG. 1, of a torque converter in accordance with a sixth embodiment of the present invention.

A torque converter 1f in accordance with a sixth embodiment of the present invention is shown in FIG. 7. The embodiment shown in FIG. 7 is similar to the torque converter 1e in Embodiment 5. However, the hydraulic operating device 10 in the torque converter 1f, includes a cover plate 75 covering an outer circumferential side of the diaphragm spring 36. The cover plate 75 is fixed to an outer circumferential tubular portion of the front cover 4 and has an annular supporter 75a supporting an outer circumferential end of the diaphragm spring 36. The cover plate 75 is further provided in an outer circumferential portion a tube 75b extending in axial directions. Two second power input plates 64 are engaged with the tube 75b so as to move in axial directions in a specified range but not to relatively rotate. In this embodiment, since pushing force by the diaphragm spring 36 is received by the cover plate 75, load applied to a turbine 14 is reduced. Consequently, load applied to the first bearing 16 supporting the turbine 14 is reduced, and it functional life may be extended.

Embodiment 7

Figure 8:
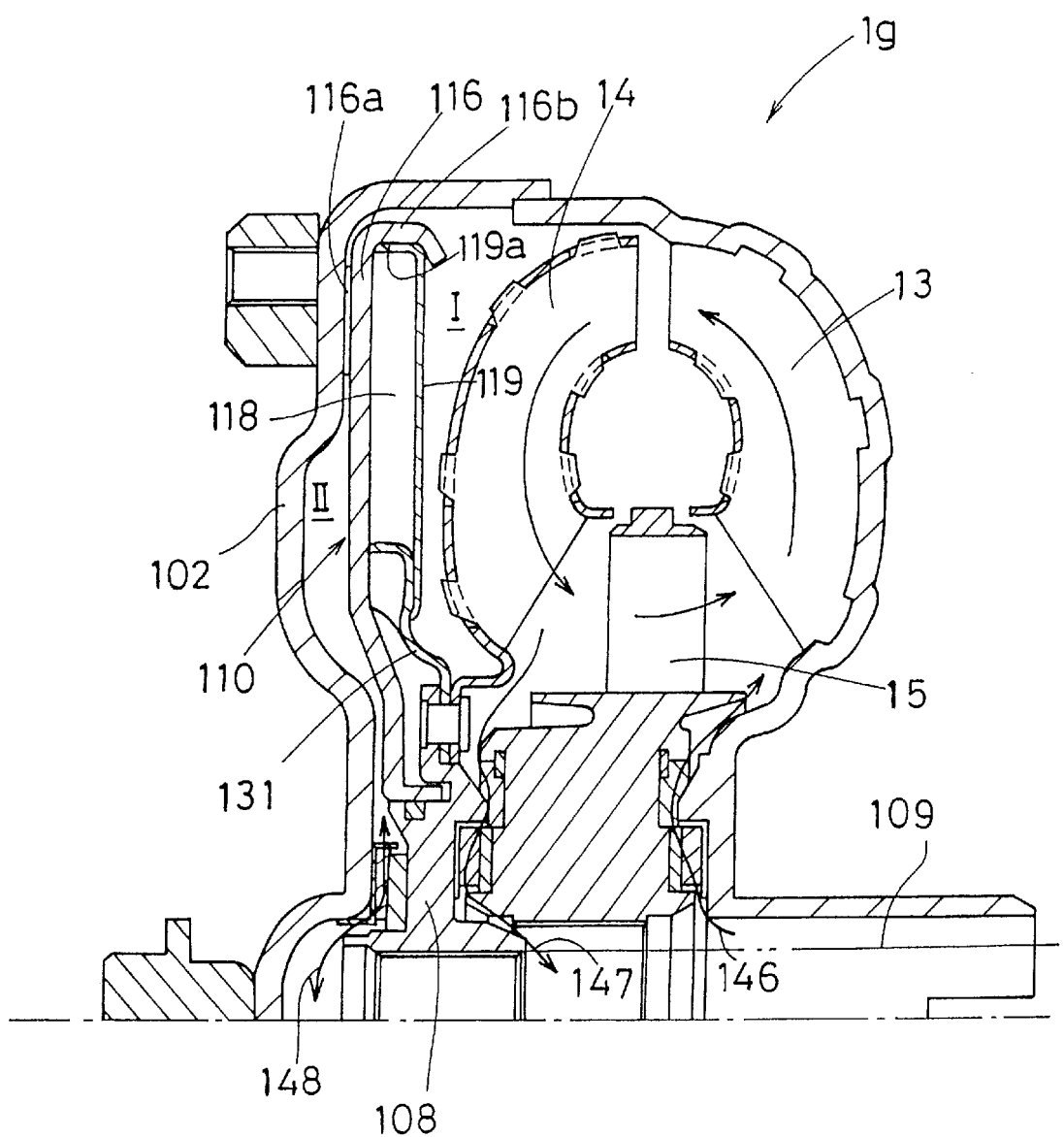
FIG. 8 is a fragmentary side sectional view of a torque converter in accordance with a seventh embodiment of the present invention.

FIG. 8 is a schematic sectional view showing a torque converter 1g in a seventh embodiment of the present invention.

The torque converter 1g primarily includes three types of turbine elements, an impeller 13, a turbine 14 and a stator 15. The impeller 13 together with a front cover 102 coupled to the crank shaft (not shown) of an engine (not shown) constitutes a hydraulic oil chamber. The turbine 14 is coupled to the main drive shaft 109 through a turbine hub 108. The stator 15 is placed between an inner circumferential portion of the impeller 13 and a hub 108 attached to an inner circumferential portion of the turbine 14.

A lock-up clutch 110 is placed in a space defined by and between the front cover 102 and the turbine 14. The lock-up clutch 110 includes a piston 116, a plate element 119 defining a viscous fluid charged chamber along with the piston 116, a pair of undulated plate springs 118 disposed within the viscous fluid charged chamber, and a plate element 131 fixed to the turbine hub 108.

The undulated plate springs 118 are elements for transmitting torque applied from the piston 116 to the plate element 131. The undulated plate springs 118 are made of plate-like elements of a certain width continually bent in longitudinal directions, as shown in FIG. 11, and in this embodiment, two of the plate-like elements are used.

Figure 12:
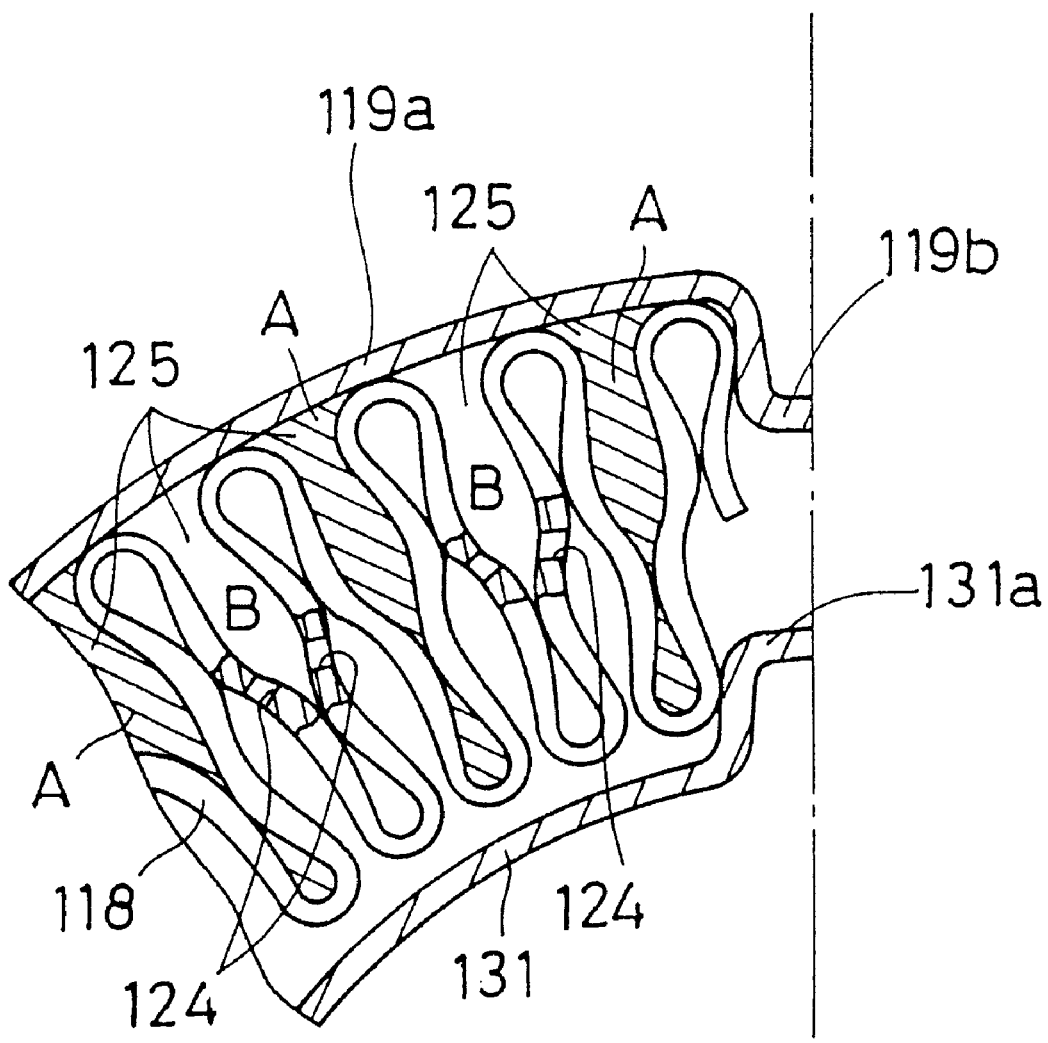
FIG. 12 a fragmentary, part section, front view of the undulated ribbon like spring depicted in FIG. 11, shown within a chamber formed within the torque converter depicted in FIG. 8.

The viscous fluid charged chamber is confined within the piston 116 and the plate element 119. The piston 116 is a disk-like element and has its inner circumferential portion supported by the turbine hub 108 so as to be rotatable and movable in axial directions. An annular friction element 116a is fixed to a surface of an outer circumferential portion of the piston 116 opposed to the front cover 102. Moreover, in the outer circumferential portion of the piston 116, a tube 116b protruding toward the turbine 14 is formed. The plate element 19 is a disc-like element placed with a specified distance from the piston 116 and defines the viscous fluid charged chamber along with the piston 116. An outer circumferential portion of the plate element 119 is shaped to form a tube 119a that is confined within an inner circumferential side of the tube 116b. A plate element 131 is a disc-like element and has its inner circumferential end fixed to the turbine hub 108 and its outer circumferential portion inserted in an inner circumference of the viscous fluid charged chamber. As shown in FIG. 12, the tube 119a of the plate element 119 is provided in two opposed positions with engaging portions 119b protruding inward toward one another. In an outer circumferential portion of the plate element 131, engaging portions 131a protruding outward are formed in two opposed positions. The viscous fluid charged chamber is divided inside into two cells by the engaging portions 119b and 131a. The undulated plate springs 118 are respectively disposed in arc shape in the cells of the viscous fluid charged chamber.

The undulated plate springs 118 will be described in detail, referring to FIG. 11. As shown in FIG. 11, the undulated plate springs 18 are made of a plurality of spring elements connected in series, which are made up of arc portions 120 and levers 121. The spring elements are connected to each other by the levers 121 to form a continuous undulated spring.

Figure 11:
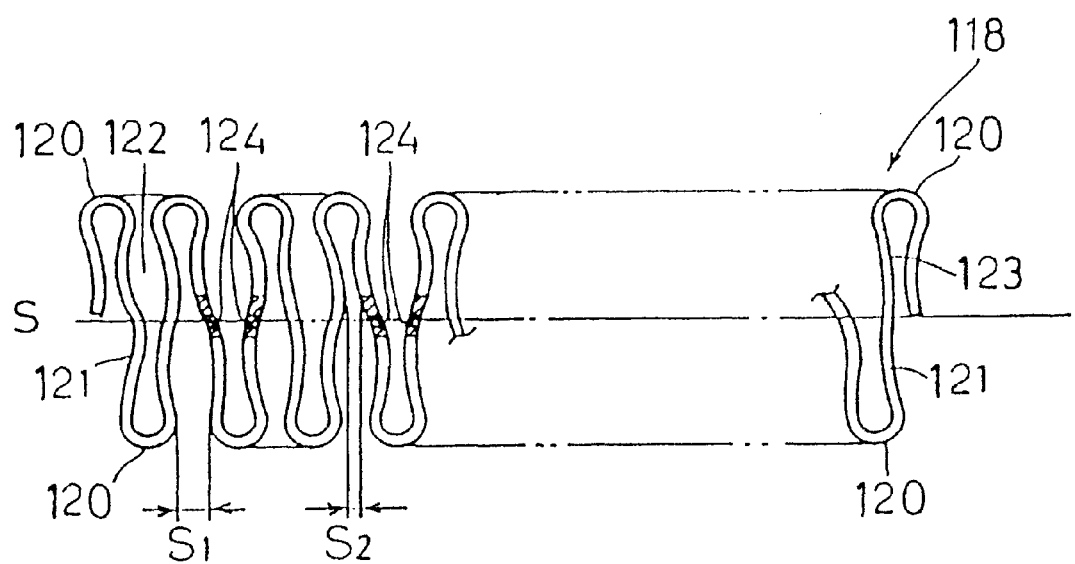
FIG. 11 is a fragmentary, part section, front view of an undulated ribbon like spring employed in the torque converter depicted in FIG. 8, shown removed from the torque converter.

The arc portions 120 are annular in shape with roughly the same diameter, and there is a given clearance gap $S_1$ between adjacent ones of the arc portions 120 when in a stress free state (shown in FIG. 11). Inside the arc portions 120, openings ends 123 are formed. The openings ends 123 have a clearance gap $S_2$ when they are under a free condition or a set condition, and the levers 121 extend outward from opposite sides of each of the openings ends 123. The levers 121 extend so that a distance between them becomes larger as they go outward, and they are contiguous to one of the levers 121 extending from opposite one of the arc portions 120.

A width of the undulated plate springs 18 are almost equal to that of the viscous fluid charged chamber, and its length in radial directions is smaller than that of the viscous fluid charged chamber. When the undulated plate springs 118 are inserted into the viscous fluid charged chamber, as shown in FIG. 12, there are a plurality of closed spaces 125 defined between the tube 119a and the undulated plate springs 118. In part of the levers 121 of the undulated plate springs 118, holes 124 are formed to make hydraulic oil reserved in some of the closed spaces 125 flow out. In this embodiment, the holes 124 are formed so that the hydraulic oil flows from every other ones of the closed spaces 125.

The arc portions 120 at outside opposite ends of the undulated plate springs 118 are engaged with the engaging portions 119b while the arc portions 120 at inside opposite ends are engaged with the engaging portions 131a. In such a configuration, the torque applied to the piston 116 is transmitted to the plate element 131 through the undulated plate springs 118.

As is shown in FIG. 8, space I is formed between a back surface of the turbine 14 and the piston 116 while a space II is formed between the piston 116 and the front cover 102. The friction element 116a is pressed at its outer circumferential portion by the front cover 102 to close the space II. An inner circumferential portion of the space II is conducted to a third oil duct 148 (described in greater detail below) passing through the main drive shaft 109.

Figure 9:
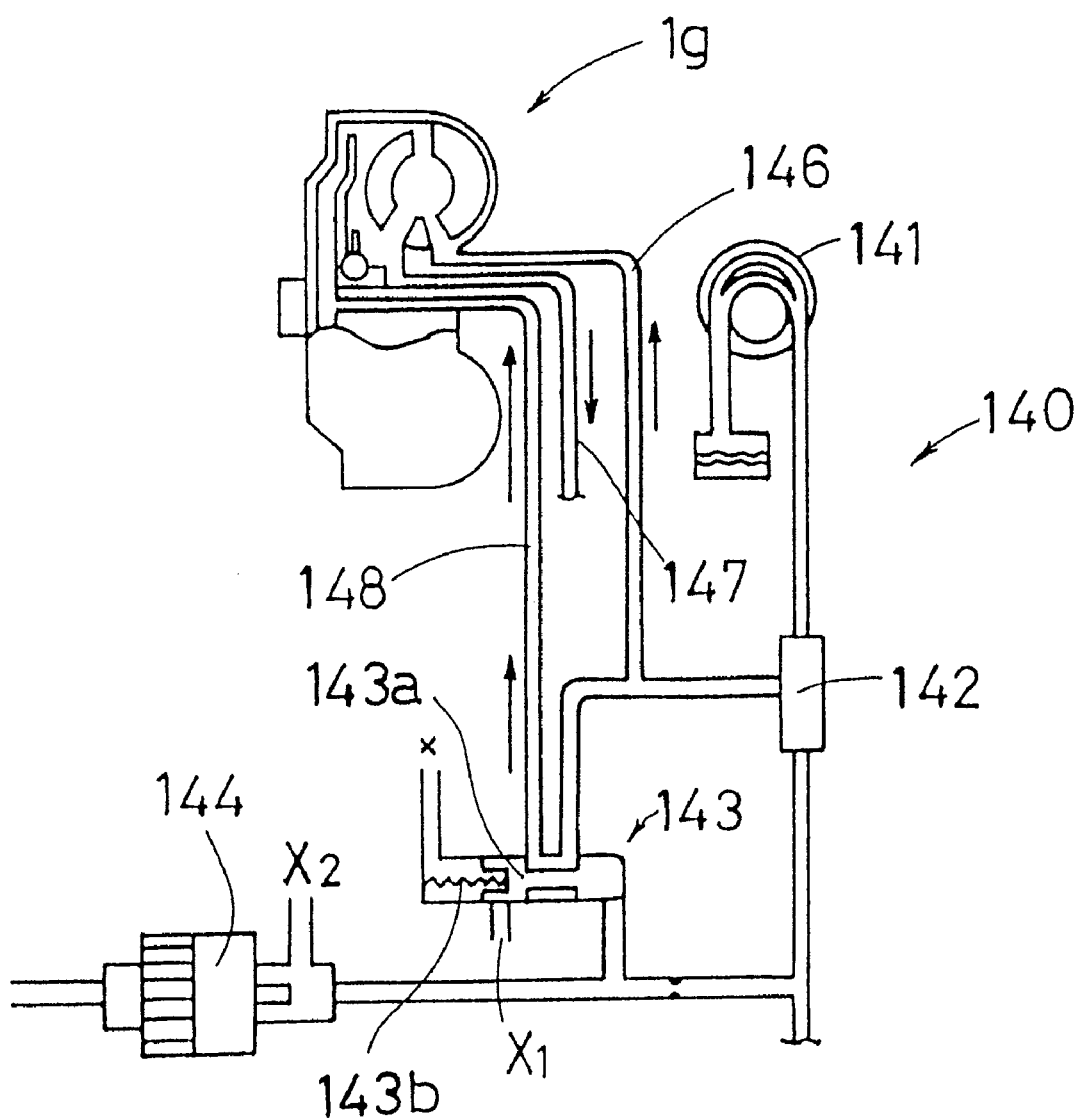
FIG. 9 is a schematic view of a hydraulic fluid control system associated with the torque converter depicted in FIG. 8, showing one fluid flow state.

FIG. 9 depicts a hydraulic pressure control circuit 140 for controlling hydraulic pressure within the torque converter 1g. The hydraulic oil is supplied from a oil pump 141 to the torque converter 1g, a lock-up control valve 143 and a lock-up solenoid 144 through a pressure regulator 142. A first oil duct 146 is a duct for supplying hydraulic oil from the pressure Iregulator 142 to the impeller 13. A second oil duct 147 is a duct for draining the hydraulic oil flowing from the turbine 14. The third oil duct 148 extends from the lock-up control valve 143, passing through the main drive shaft 109, and is conducted to the space II within the torque converter 1g.

An operation of the torque converter will now be described.

In a state as shown in FIG. 9, the lock-up solenoid 144 is in a disengaged state, and the hydraulic oil drains from a drain $X_2$ of the lock-up solenoid 144. As a result, there is no hydraulic pressure in a head of a piston of the lock-up control valve 143, and the piston is pushed to the right in FIG. 9 by force of a spring 143b to close a drain $X_1$. In this way, the lock-up control valve 143 leads the hydraulic oil from the pressure regulator 142 to the third oil duct 148. This causes hydraulic pressure to act in the space II within the torque converter 1g, and this then causes the piston 116 to move to the right in FIG. 8. Under the condition, the friction element 116a is released from the front cover 102; that is, the lock-up clutch 110 is disengaged.

Figure 10:
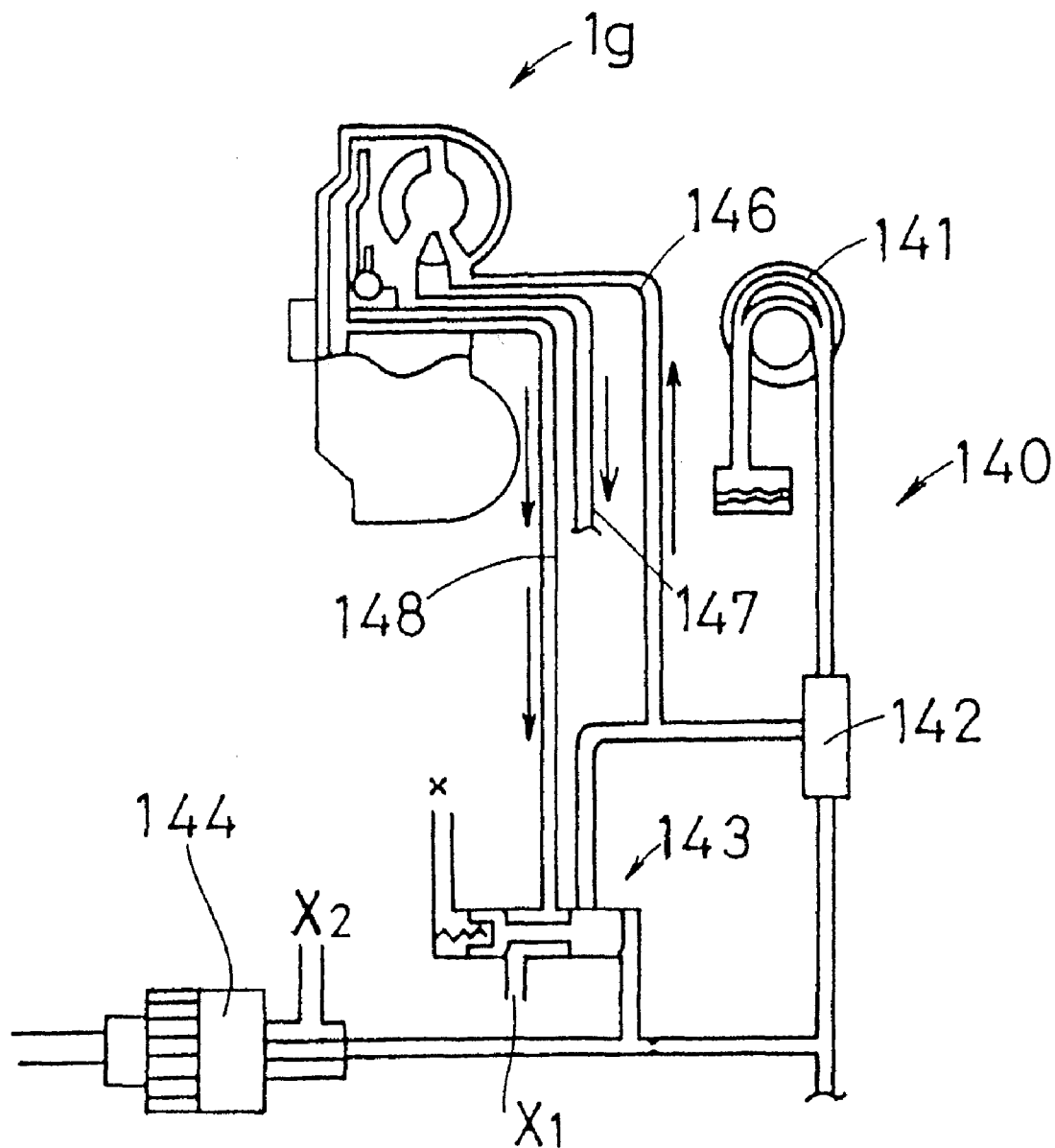
FIG. 10 is a schematic view of the hydraulic fluid control system depicted in FIG. 9, showing a second fluid flow state.

When a speed of the vehicle reaches a specified level, the lock-up solenoid 144 responds to a signal from a speed sensor (not shown) to turn on. Then, as shown in FIG. 10, the hydraulic pressure pushes the piston of the lock-up control valve 143 to the left in FIG. 10, and the hydraulic oil within the space II of the torque converter 1g is drained therefrom through the third oil duct 148 and the lock-up control valve 143. This causes the hydraulic pressure within the space II to become lower than that in the space I, and consequently, the piston 116 moves toward the left in FIG. 8. In this situation, the friction element 116a is pressed against the front cover 102.

When torsional vibration is transmitted to the piston 116 while the lock-up clutch 110 is engaged, the undulated plate springs 118 are compressed to dampen the torsional vibration. When the undulated plate springs 118 are compressed, an opening angle made by the levers 121 becomes smaller, and bending moment affects the arc portions 120. In this situation, the levers 121 flex with fulcrums of the opening ends 123. The bending moment is dispersed uniformly in longitudinal directions in the levers 121, and elastic energy is separately stored by the arc portions 120.

A torsional characteristic in this case depends upon torsional rigidity of the undulated plate springs 118. For example, in a range of a small torsional angle where the opening ends 123 have the clearance gap $S_2$, the arc portions 120 and the levers 121 flex in the same direction with fulcrums of an outer circumferential portions of the arc portions 120 of the undulated plate springs 118, and the torsional rigidity is small. On the other hand, when the torsional angle becomes larger, the clearance gap $S_2$ reaches zero, and the torsional rigidity is increased because the elastic energy is stored by the arc portions 120 with the fulcrums of the opening ends 123.

When the undulated plate springs 118 are compressed in the viscous fluid charged chamber as mentioned before, the hydraulic oil passes through a clearance gap defined by the undulated plate springs 118 and the viscous fluid charged chamber, and viscous force produces vibration dampening force. This eftect will be explained below, referring to FIG. 12.

As illustrated in FIG. 12, no holes are formed in the levers 121 defining the closed spaces 125 in a hatched region A in the closed spaces 125. Hence, when the undulated plate springs 118 are compressed, the hydraulic oil passes through a small gap between the undulated plate springs and the viscous fluid charged chamber, and a high level of viscous resistance is developed. On the other hand, in another region B in the closed spaces 125, the holes 124 are formed in the levers 121. Thus, the hydraulic oil flows through the holes 124, and the viscous resistance becomes small.

Figure 13:
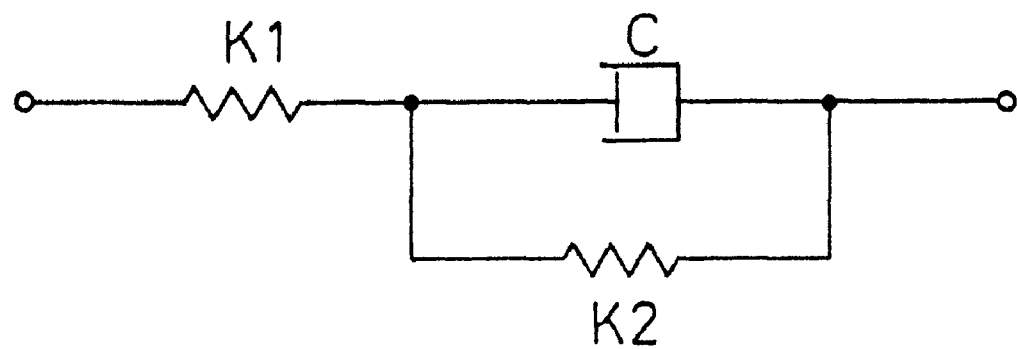
FIG. 13 force diagram showing a dynamic model of the torque converter depicted in FIG. 8.

A model of the power transmission system which includes the hydraulic oil and the undulated plate spring 118 housed in the viscous fluid charged chamber would be depicted in FIG. 13. Referring to FIG. 13, K1 denotes a spring component made by the region B in FIG. 12 while K2 is a spring component made by the region A. C is a viscous resistance generating element made by the region A. In FIG. 13, viscous resistance Fc and spring force Fk are expressed as follows:

Fc=C·dθ/dt  dθ/dt: rotation speed

Fk=K·θ  θ: displacement of rotation angle

In the configuration as stated above, the spring force of the region A is small and the viscous resistance in the same region is large because non-compressible viscous fluid is housed in the region A and also because the clearance gaps are small therein. Thus, FC>>Fk2 is given. Hence, the spring component K2 in FIG. 13 may be ignored, and the spring force of the spring component K1 and the viscous resistance act in series, and this is effective to reduce the resonance trequency.

If the undulated plate springs 118 are not provided in part with the holes 124, the undulated plate springs 118 are transformed inward so as to be released from the tube 119a since the hydraulic oil is non-compressible. In such a case, expansion of the clearance gaps where the hydraulic oil passes prevents from attaining a desired level of the viscous resistance, and the power transmission system where the spring force and the viscous resistance act in series cannot be implemented.

In this embodiment as has been described, the undulated plate spring 118 is used to downsize the torque converter in dimension in axial directions, compared to the prior art employing coil springs. In addition to that, since the viscous fluid charged chamber and the undulated plate spring 118 develop both the elastic force and the viscous resistance, a very simple configuration attains effective dampening of torsional vibration.

In the above-mentioned embodiment, although the space $S_2$ is retained in the opening ends 123 in setting the undulated plate springs, the space $S_2$ of the openings 123 in the setting may be zero.

Embodiment 8

Figure 14:
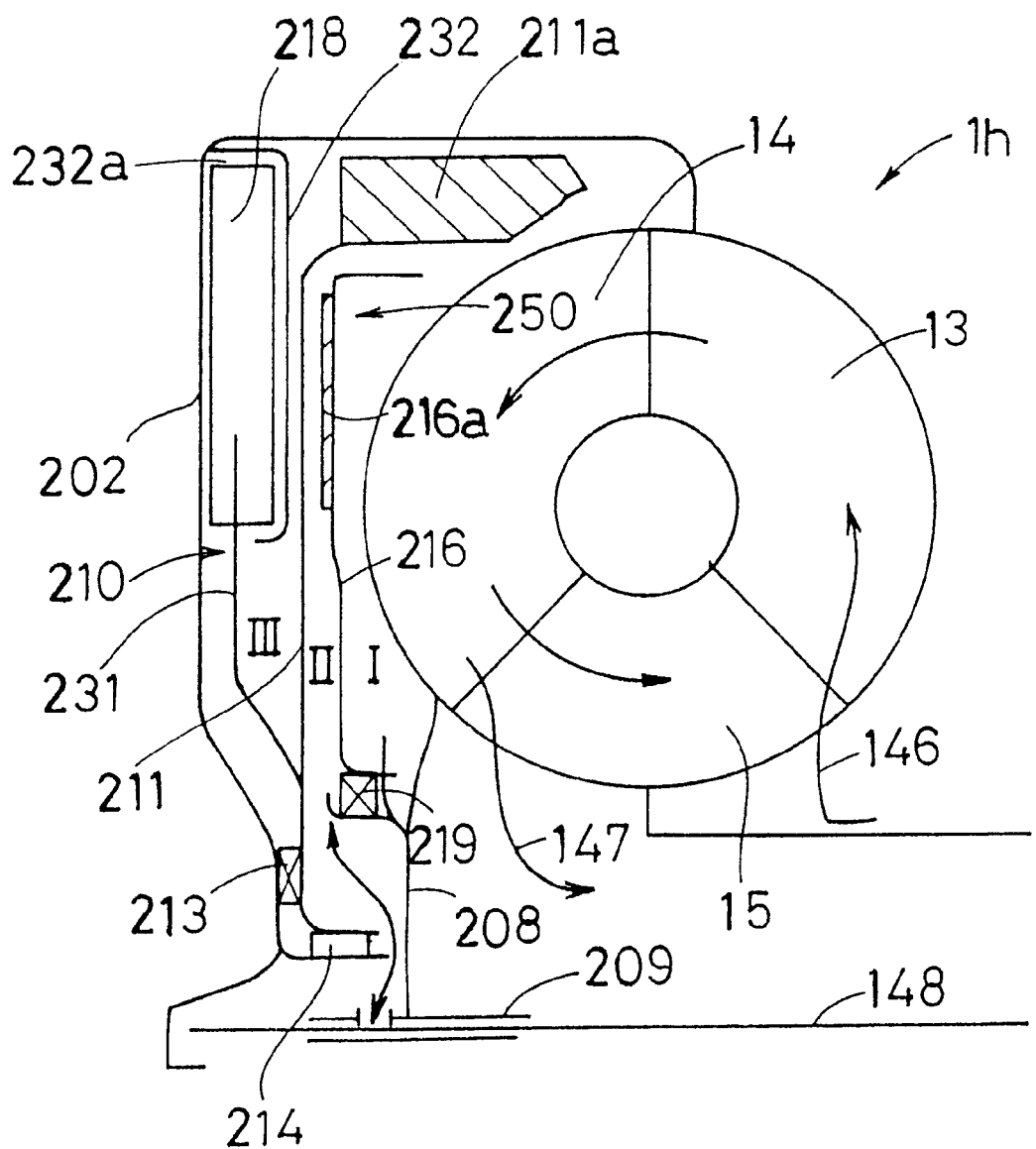
FIG. 14 a schematic side view similar to FIG. 1, of a torque converter in accordance with a eighth embodiment of the present invention.
Figure 15:
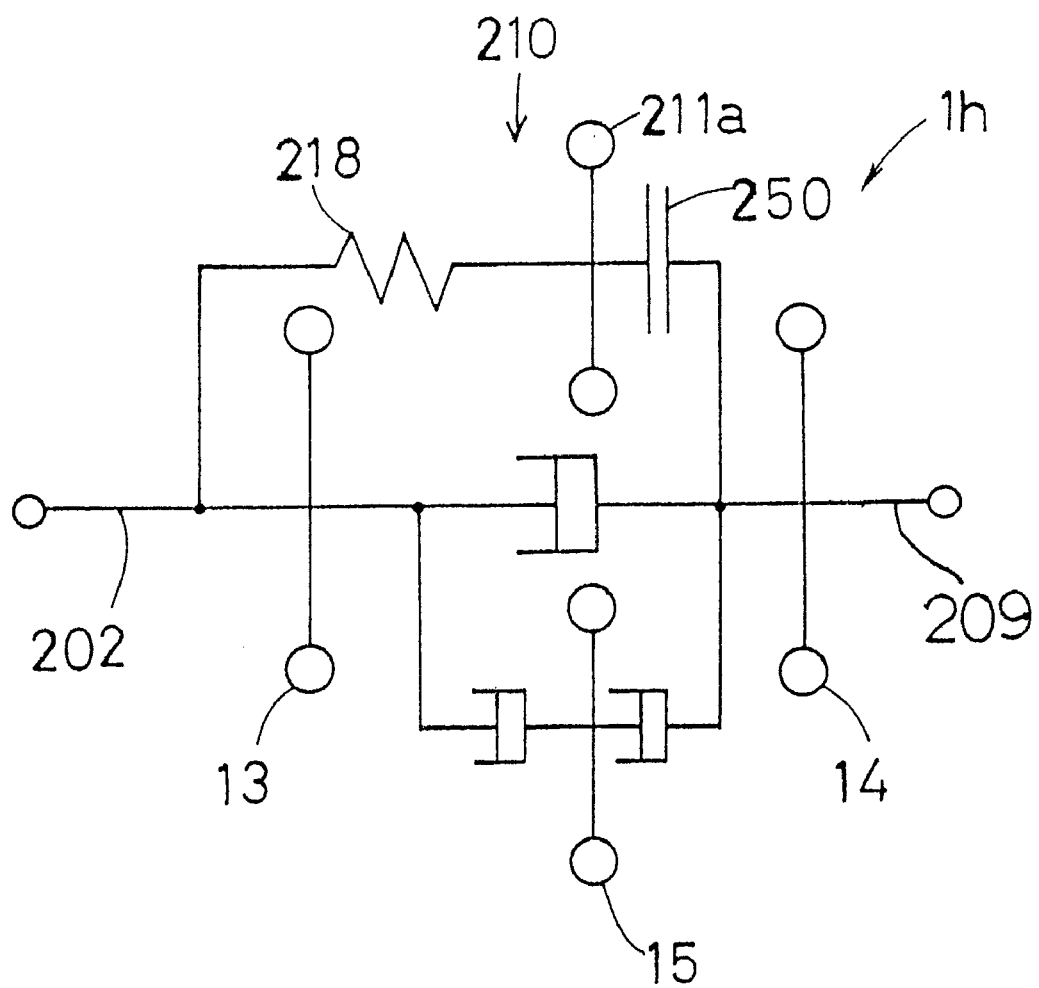
FIG. 15 force diagram showing a dynamic model of the torque converter depicted in FIG. 14.

FIG. 14 is a schematic sectional view showing a torque converter 1h in an eighth preferred embodiment of the present invention while FIG. 15 is a view of a dynamic model of the same.

A lock-up clutch 210 is placed in a space between a front cover 202 and a turbine 14. The lock-up clutch 210 primarily includes an inertia plate 211, a pair of undulated plate springs 218 placed within a viscous fluid charged chamber 232a, which is defined within a disc-shaped plate element 232, and a piston 216.

The inertia plate 211 is a disc-like element placed on a side of the front cover 202. An inner circumferential end of the inertia plate 211 is tubular in shape, protruding toward the transmission, and is supported by a thrust bearing 213 and a bush 214 so as to relatively rotate to the front cover 202. In an outer circumference of the inertia plate 211, an annular weight 211a is fixed. The inertia plate 211 is coupled to the undulated plate springs 218 through a plate element 231.

The piston 216 is a disc-like element placed close to the turbine 14 beside the inertia plate 211, and has its inner circuaferential end supported by a turbine hub 20B through a bearing 219 so as to rotate with the turbine hub 208 and engaged with the turbine hub 208 so as to move in axial directions. In a surface opposed to the inertia plate 211 in an cuter circumferential portion of the piston 216, an annular friction element 216a is fixed.

In the above-mentioned configuration, a clutch 250 includes an outer circumferential portion of the inertia plate 211 and a friction element 216a of the piston 216.

The disc-shaped plate element 232 fixed to the front cover 202 defines a viscous fluid charged chamber 232a. Within the viscous fluid charged chamber, the undulated plate springs 218, similar to those as explained in the seventh embodiment with reference to FIGS. 8, 11 and 12, are disposed. The plate element 231 has its inner circumferential portion fixed to the inertia plate 211 and its outer circumferential portion inserted in the viscous fluid charged chamber and engaged with the undulated plate springs 218.

A space I is defined between a back surface of the turbine 14 and the piston 216, a space II is defined by and between the piston 216 and the inertia plate 211, and a space III is defined by and between the inertia plate 211 and the front cover 202. The space I and the space III are conducted to each other in their respective outer circumferential portions. The space II is closed in the outer circumferential portion with the friction element 116a of the piston 216 being pressed against the inertia plate 211. The inner circumference of space II open to the third oil duct 148 passing through a main drive shaft 209.

In a state where the piston 116 moves to the right in FIG. 14, the friction element 216a is detached from the inertia plate 211; that is, the lock-up clutch 210 is disengaged. Under the condition, the weight 211a functions as a dynamic damper of a power input mechanism through the undulated plate springs 218 to dampen vibration in the engine.

In a state where the piston 216 is moved to the left in FIG. 14, the friction element 216a is pressed against the inertia plate 211. In this situation, as will be recognized in FIG. 15, torque is transmitted from the front cover 202 to the main drive shaft 209 through the undulated plate springs 218. Under the condition, the weight 211a increases a ratio of moment of inertia of a power output mechanism to a power input mechanism. In consequence, resonance frequency is reduced to the number of idle revolution of a speed of the vehicle or under, and occurrence of abnormal sound like clattering sound and internal indistinct sound in the transmission is reduced.

Embodiment 9

Figure 16:
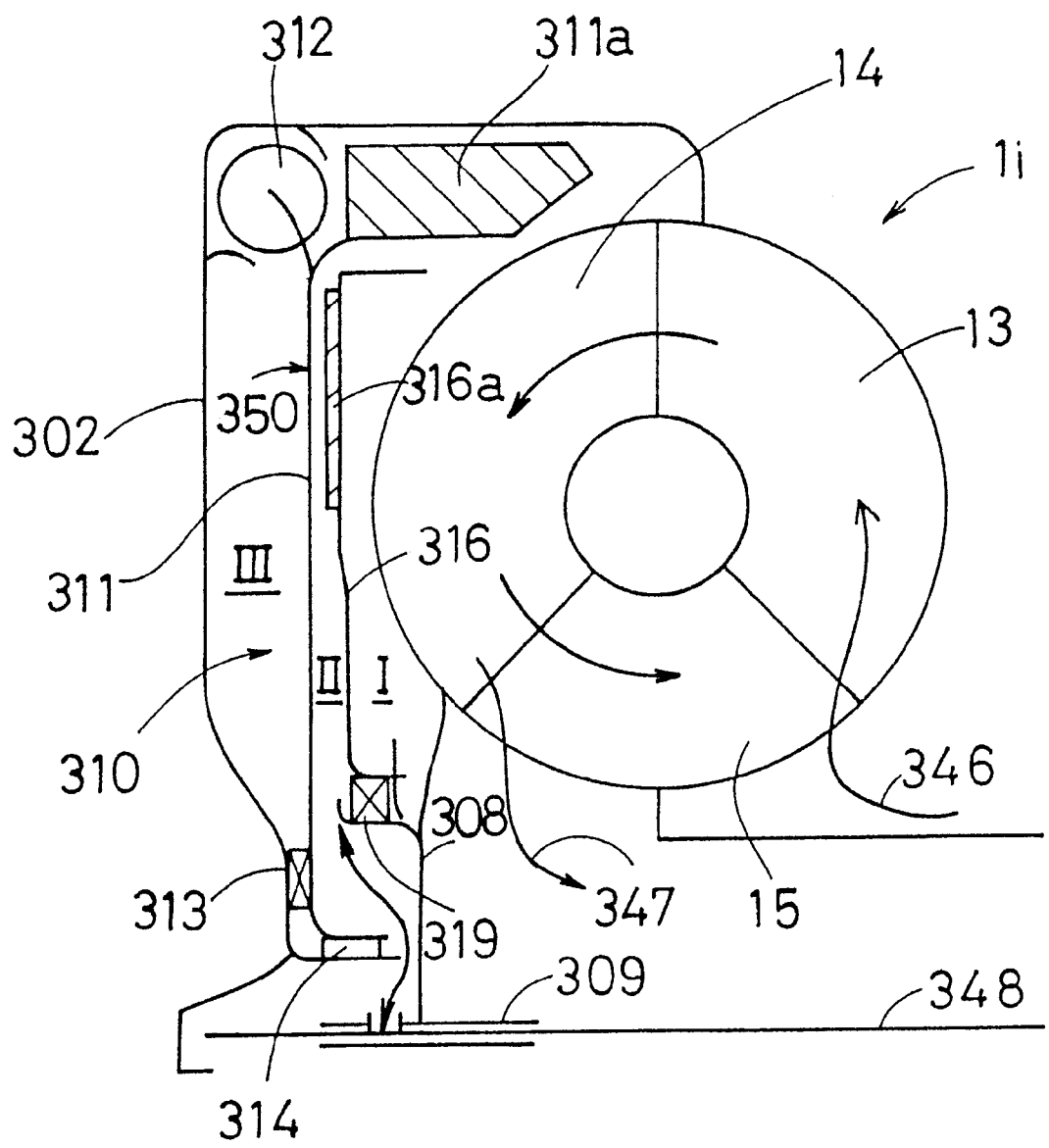
FIG. 16 a schematic side view similar to FIG. 1, of a torque converter in accordance with a ninth embodiment of the present invention.

FIG. 16 is a schematic sectional view showing a torque converter 1i in accordance with a ninth embodiment of the present invention.

The torque converter 1i primarily includes an impeller 13, a turbine 14 and a stator 15. The impeller 13 along with a front cover 302 coupled to the crank shaft (not shown) defines a hydraulic oil chamber. The turbine 14 is coupled to the main drive shaft 309 through a turbine hub 308. The stator 15 is placed between inner circumferential portions of the impeller 13 and the turbine 308.

A lock-up clutch 310 is placed in a space between the front cover 302 and the turbine 304. The lock-up clutch 310 primarily includes an inertia plate 311, a plurality of coil springs 312 and a piston 316.

The inertia plate 311 is a disc-shaped element disposed adjacent to the front cover 302. An inner circumferential end of the inertia plate 311 is tubular in shape, protruding toward the impeller 13, and it is supported by a thrust bearing 313 and a bush 314 so as to relatively rotate to the front cover 302. In an outer circumference of the inertia plate 311, an annular weight 311a is fixed. The inertia plate 311 has its outer circumferential portion coupled to the front cover 302 through a plurality of coil springs 312.

The piston 316 is a disc-like element placed adjacent to the inertia plate 311, and has its inner circumferential end supported by the turbine hub 308 through a bearing 319 so as to relatively rotate and move in axial directions. In a surface of an outer circumferential portion of the piston 316 opposed to the inertia plate 311, an annular friction element 316a is fixed.

In the above-mentioned configuration, a clutch 350 is formed of an outer circumferential portion of the inertia plate 311 and the friction element 316a of the piston 316. A space I is defined by and between the back surface of the turbine 14 and the piston 316, a space II is defined by and between the piston 316 and the inertia plate 311, and a space III is defined by and between the inertia plate 311 and the front cover 302. The space I and the space III are open to each other in their respective outer circumferences. The space II is closed with the friction element 316a of the piston 316 being in contact with the inertia plate 311 at its outer circumferential portion. The space II has its inner circumferential portion open to the third oil duct 148 (FIGS. 9 and 10) passing through the main drive shaft 309.

An operation of the torque converter will now be described. It should be appreciated that the hydraulic pressure control circuit 140 may be used with the ninth embodiment and other embodiments of the present invention.

In the state shown in FIG. 9, the lock-up solenoid 144 is turned off, and hydraulic oil is drained from a valve of the lock-up solenoid 144. As a result, there is no hydraulic pressure in a head of a piston of a lock-up control valve 143, and the piston is pushed to the right in the drawing by force of spring and closes a drain. In this way, the lock-up control valve 143 leads the hydraulic oil from a pressure regulator 142 to the third oil duct 148 (FIGS. 9 and 10). This causes hydraulic pressure to work in the space II within the torque converter 1$i$, so that the piston 316 is moved to the right in FIG. 16. Under this condition, the friction element 316$a$ of the piston 316 is detached from the inertia plate 311; that is, the lock-up clutch 310 is disengaged. In this situation, the weight 311$a$ functions as a dynamic damper of a power input mechanism through a coil spring 312 to dampen vibration in the engine.

When a speed of the vehicle reaches a certain level, the lock-up solenoid 144 responds to a signal from a speed sensor not shown to turn on. Then, as shown in FIG. 10, the hydraulic pressure causes the piston of the lock-up control valve 143 to be pushed to the left in FIG. 10, and this allows the hydraulic oil in the space II of the torque converter 1$i$ is drained through the third oil duct 148 (FIGS. 9 and 10) and the lock-up control valve 343. As a result, the hydraulic pressure within the space II becomes lower than those in the space I and the space III, and the piston 316 moves toward the left in FIG. 16. Under this condition, the friction element 316$a$ of the piston 316 is pushed against the inertia plate 311. In this situation, as can be seen in FIG. 15, torque is transmitted from the front cover 302 to the main drive shaft 309 through the coil spring 312, and the weight 311$a$ increases a ratio of moment of inertia of a power output mechanism to a power input mechanism. In consequence, resonance frequency is reduced to the number of idle revolution of the speed of the vehicle engine or under, and occurrence of abnormal sound like clattering sound and internal indistinct sound of the transmission can be reduced during an ordinary driving.

Embodiment 10

Figure 17:
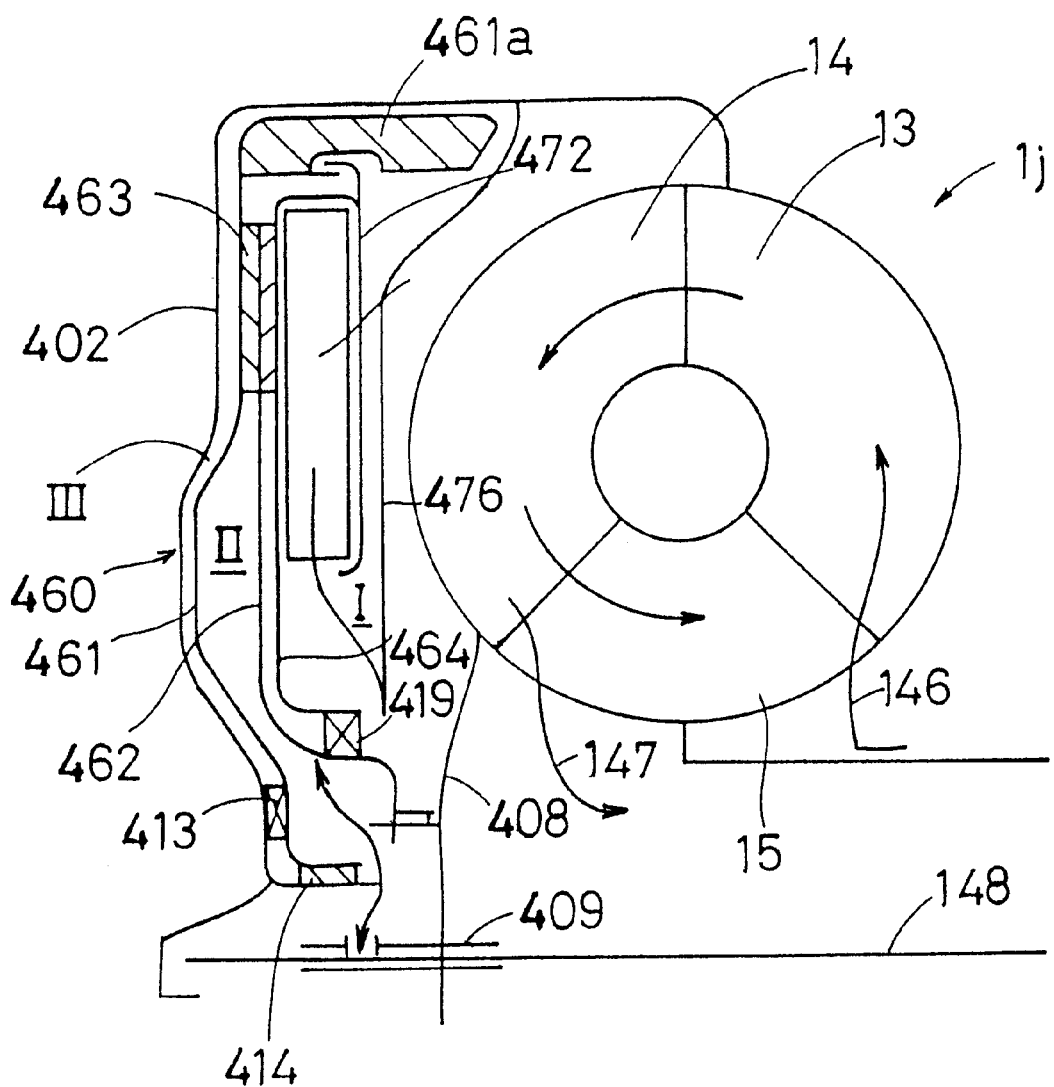
FIG. 17 a schematic side view similar to FIG. 1, of a torque converter in accordance with a tenth embodiment of the present invention.

A lock-up clutch 460 in a torque converter 1$j$ in accordance with a tenth embodiment of the present invention is shown in FIG. 17. The lock-up clutch 460 primarily includes an inertia plate 461, a power output plate 462, a piston 464 and a pair of undulated plate springs 475 disposed within a viscous fluid charged chamber.

The inertia plate 461 is a disc-shaped element placed on a side of the front cover 402. The inertia plate 461 has it inner circumferential end rotatably supported by the front cover 402 by a thrust bearing 413 and a bush 414. In an outer circumferential portion of the inertia plate 461, an annular weight 461$a$ is provided.

The power output plate 462 is a disc-shaped element, and its inner circumferential end is fixed to a turbine hub 408. In opposite side surfaces of an outer circumferential portion of the power output plate 462, an annular friction element 463 is fixed.

The piston 464 along with other plate elements defines a viscous fluid charged chamber. The piston 464 has its inner circumferential end rotatably supported by the turbine hub 408 through a bearing 419 and its outer circumferential end engaged with a weight 461$a$ so as not to relatively rotate but move in axial directions. Moreover, a plate element 476 coupled to the front cover 402 is inserted in an inner circumferential portion of the viscous fluid charged chamber and engages with the undulated plate springs 475. In this embodiment, while the lock-up clutch 460 is disengaged, the weight 461$a$ functions as a dynamic damper in the front cover 402 through the undulated plate springs 475.

When the lock-up clutch 460 is engaged, torque is directly transmitted from the front cover 402 to the turbine hub 408 through the lock-up clutch 460. In this situation, in addition to the effects in the previous embodiments, opposite surfaces of the power output plate 464 performs torque transmission, and therefore, abrasion of the friction element 463 is diminished for the same capacity of the torque transmission.

Embodiment 11

Figure 18:
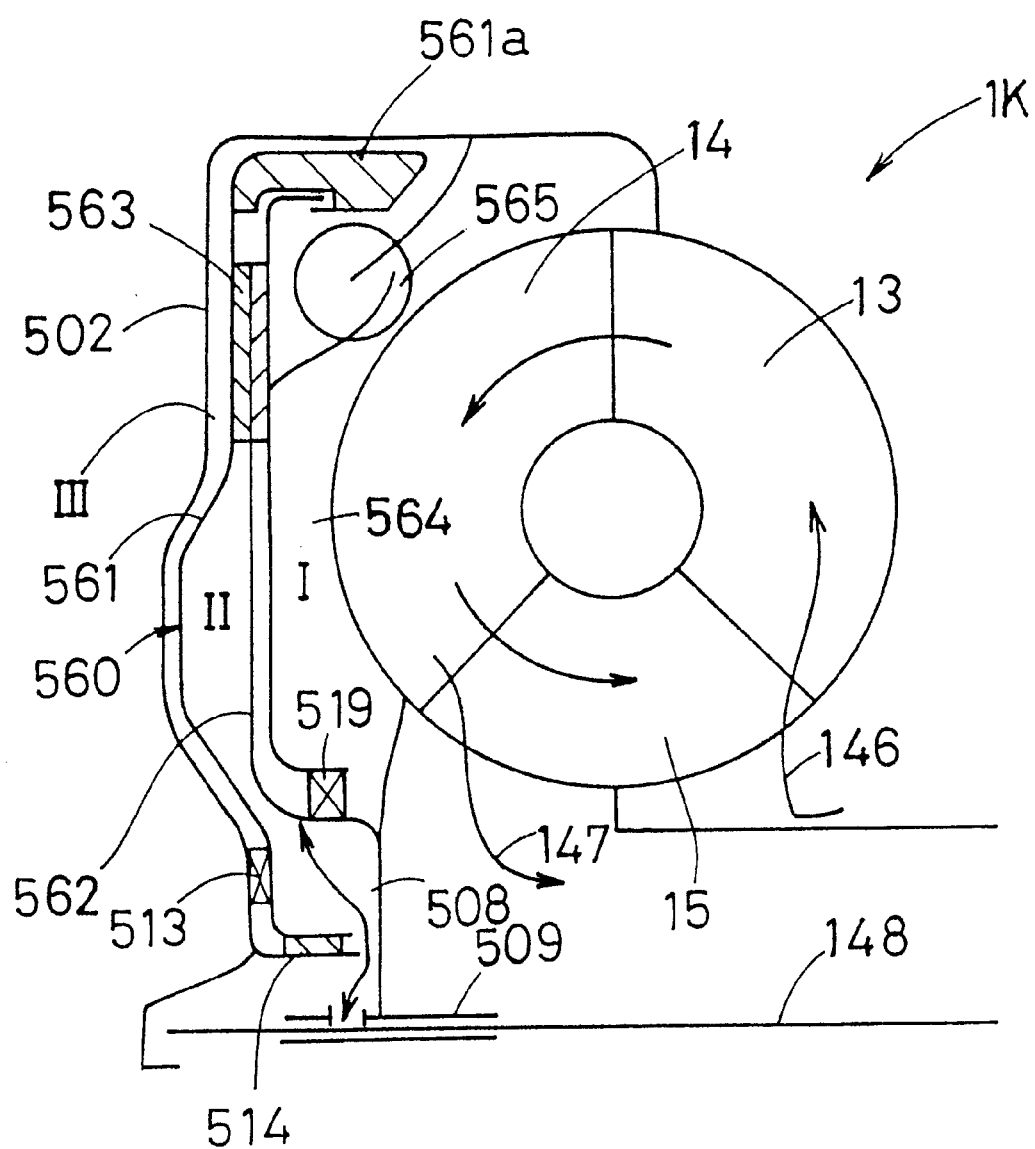
FIG. 18 a schematic side view similar to FIG. 1, of a torque converter in accordance with a eleventh embodiment of the present invention.

A lock-up clutch 560 of a torque converter 1$k$ in accordance with an eleventh embodiment of the present invention is shown in FIG. 18. The lock-up clutch 560 primarily includes an inertia plate 561, a power output plate 562, a piston 564, and a coil spring 565. The inertia plate 561 is a disc-shaped element placed on a side of the front cover 502. The inertia plate 561 has its inner circumferential end rotatably supported on the front cover 502 by a thrust bearing 513 and a bush 514. In an outer circumferential portion of the inertia plate 561, an annular weight 561$a$ is provided.

The power output plate 562 is a disc-shaped element and has its inner circumferential end fixed to a turbine hub 508. In opposite surfaces of an outer circumferential portion of the power output plate 562, an annular friction facing 563 is fixed.

A piston 564 is a disc-shaped element placed on a side of the power output plate 562. The piston 564 has its inner circumferential end rotatably supported by the turbine hub 508 through a bearing 519. The piston 564 has its outer circumferential end engaged with a weight 561$a$ so as not to relatively rotate but to move in axial directions. An outer circumferential portion of the piston 564 is coupled to the front cover 502 through a plurality of coil springs 506. In this embodiment, while the lock-up clutch 560 is disengaged, the weight 561$a$ functions as a dynamic damper in the front cover 502 through the coil springs 565.

When the lock-up clutch 560 is engaged, torque is transmitted directly from the front cover 502 to the turbine hub 508 through the lock-up clutch 560. In this situation, in addition to the effects in the previous embodiments, opposite surfaces of the power output plate 564 perform the torque transmission, abrasion of the friction facing 563 is minimized for the same capacity of the torque transmission compared to prior configurations.

Embodiment 12

Figure 19:
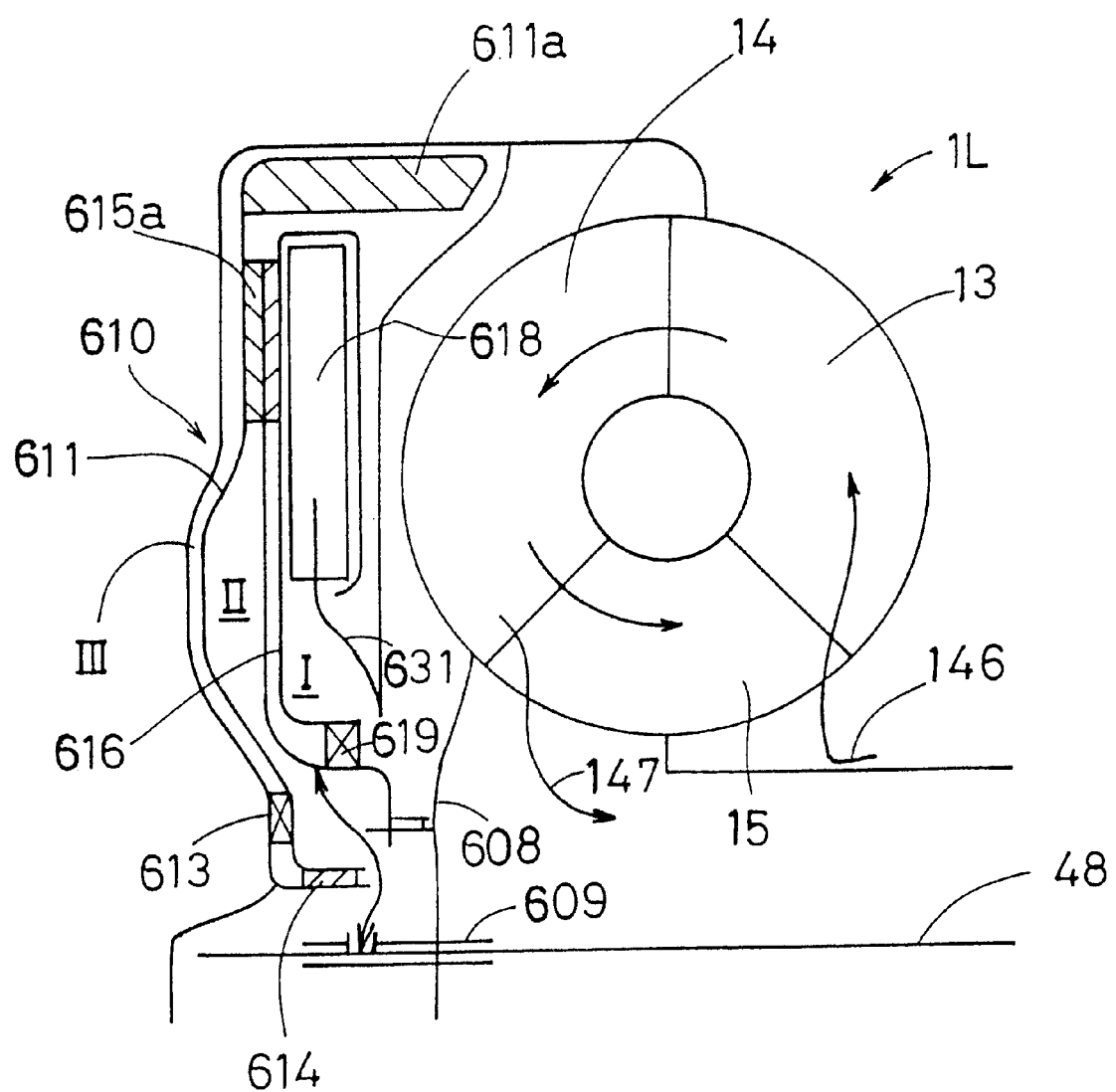
FIG. 19 a schematic side view similar to FIG. 1, of a torque converter in accordance with a twelfth embodiment of the present invention.
Figure 20:
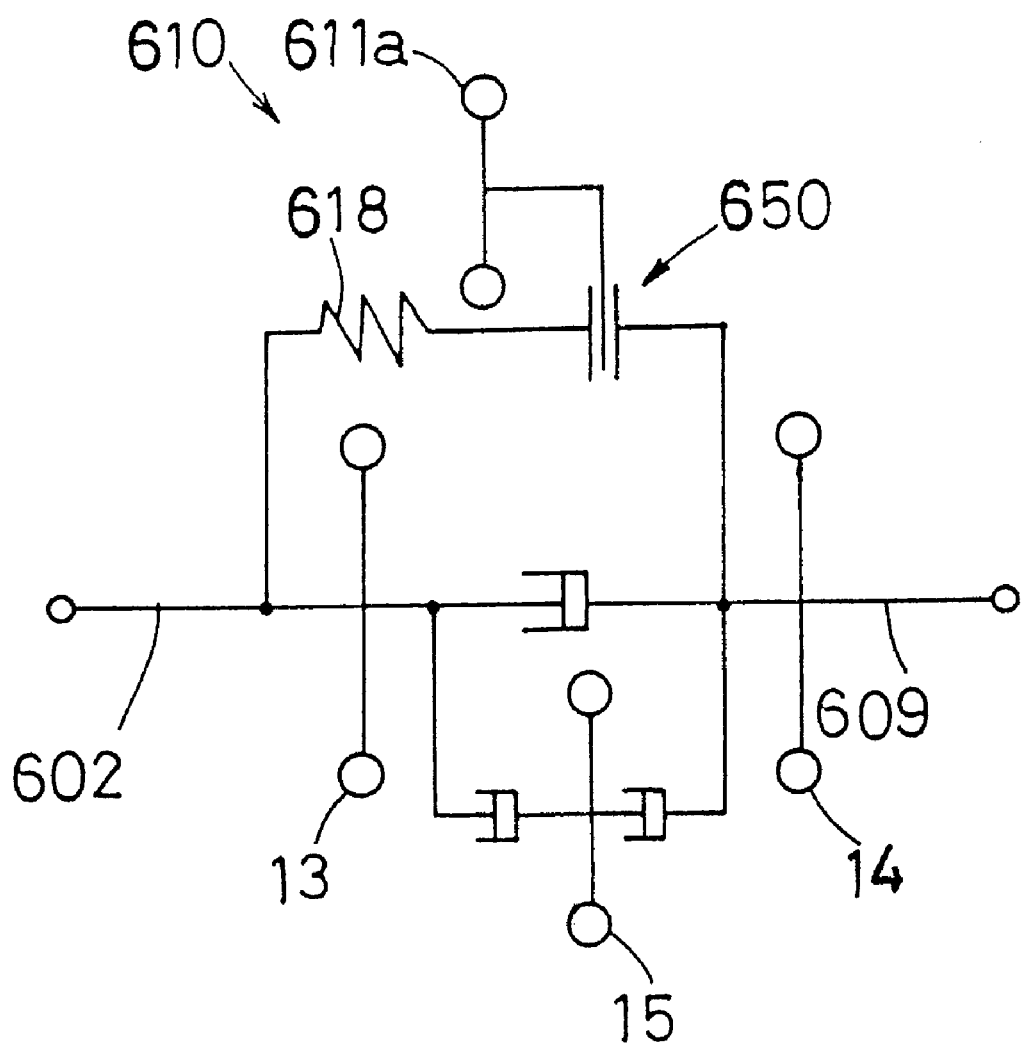
FIG. 20 is a force diagram showing a dynamic model of the torque converter depicted in FIG. 19.

FIG. 19 is a schematic sectional view showing a torque converter 1$l$ in accordance with a twelfth embodiment of the present invention while FIG. 20 is a view showing a dynamic model of the same.

A lock-up clutch 610 is placed in a space between a front cover 602 and the turbine 14. The lock-up clutch 610 primarily includes an inertial plate 611, a pair of undulated ribbon-like plate springs 618 disposed in a viscous fluid charged chamber, a power output plate 615, and a piston 616.

The inertia plate 611 is a disc-shaped element placed on a side of the springs 618. An inner circumferential end of the inertia plate 611 is tubular in shape, protruding toward a transmission, and it is supported by a thrust bearing 613 and a bush 614 so as to relatively rotate to the front cover 602. In an outer circumference of the inertia plate 611, an annular weight 611a is fixed.

A power output plate 615 is a disc-shaped element of which inner circumferential end fixed to a turbine hub 8, and an annular friction element 615a is fixed to opposite surfaces of its outer circumferential portion.

The piston 616 is a disc-shaped element placed on a side of the power output plate 615 and defines an annular viscous fluid charged chamber along with other components. The piston 616 has its inner circumferential end rotatably supported by the turbine hub 608 through a bearing 619. A plate element 631 coupled to the front cover 602 is inserted in an inner circumferential portion of the viscous fluid charged chamber and engages with the undulated ribbon-like plate springs 618.

In a configuration as mentioned above, an outer circumferential portion of the inertia plate 611, the friction element 615a of the power output plate 615 and an outer circumferential portion of the piston 616 together constitute a clutch 650.

A space I is formed by and between a back surface of the turbine 14 and the piston 616, a space II is formed by and between the piston 616 and the inertia plate 611, and a space III is formed by and between the inertia plate 611 and the front cover 602. The space I and the space III are open to each other in an outer circumferential portion. The space II is closed in its outer circumferential portion with the piston 616 pressing the friction element 615a against the inertia plate 615. The space II has its inner circumferential portion open to the third oil duct 148 (FIGS. 9 and 10) passing through a main drive shaft 609.

In a state where the piston 616 is moved to the right in FIG. 19, the friction element 615a is detached from the inertia plate 611 and the piston 616; that is, the lock-up clutch 610 is disengaged. Under this condition, the weight 611a is disconnected from the power input mechanism and the power output mechanism (as defined above).

In a state where the piston 616 moves to the left in FIG. 19, the friction element 615a is held by and between the inertia plate 611 and the piston 616. In this situation, as can be seen in FIG. 20, torque is transmitted through the undulated ribbon-like plate springs 618. Moreover, the weight 611a increases a ratio of moment of inertia of a power output mechanism to a power input mechanism. In consequence, resonance frequency is reduced to the number of idle revolution of a speed of the vehicle or under, and occurrence of abnormal sound like clattering sound and internal indistinct sound in the transmission is reduced during an ordinary driving.

Embodiment 13

Figure 21:
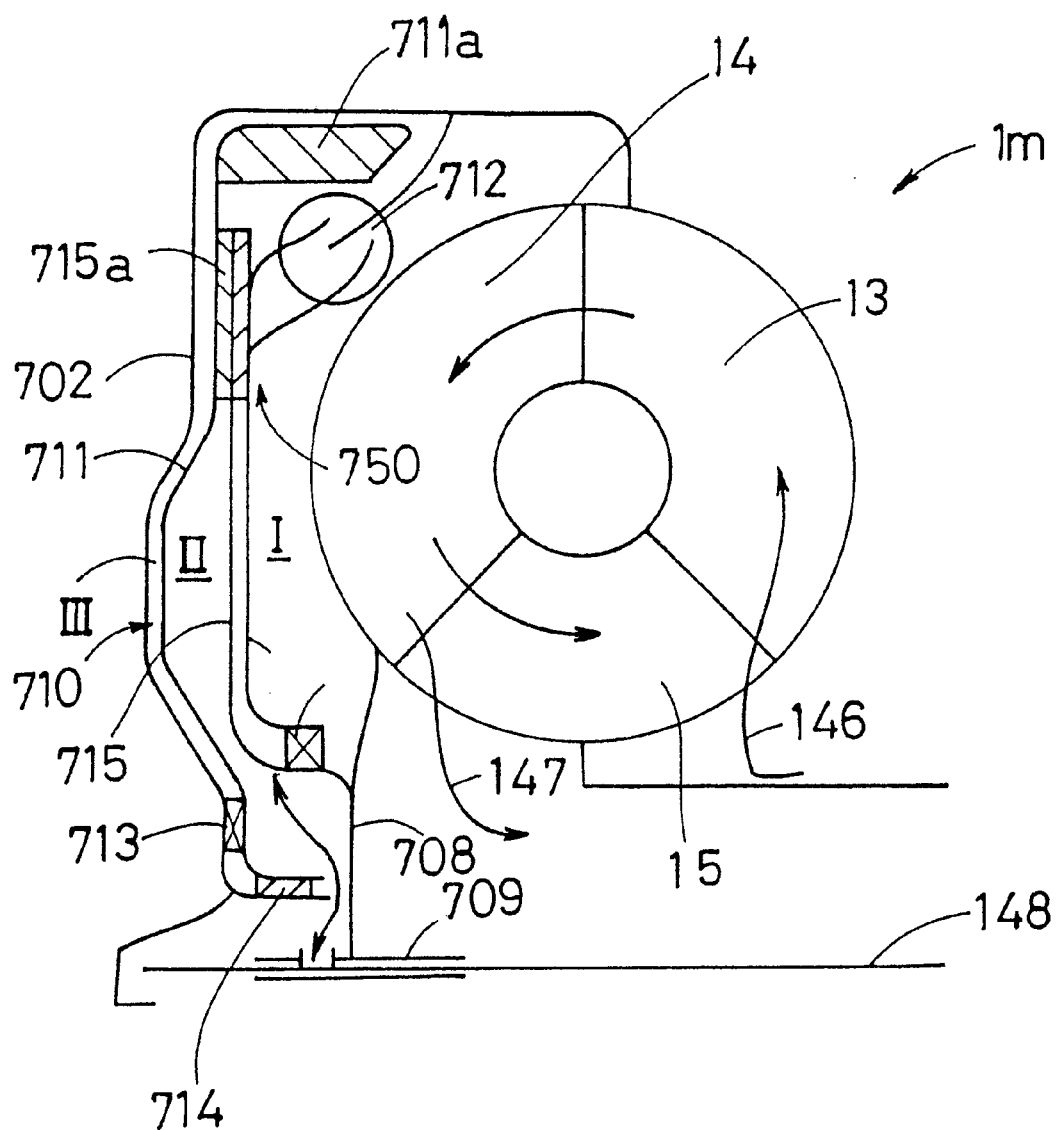
FIG. 21 a schematic side view similar to FIG. 1, of a torque converter in accordance with a thirteenth embodiment of the present invention.

FIG. 21 is a schematic sectional view showing a torque converter 1m in accordance with a thirteenth embodiment of the present invention. The torque converter 1m is a mechanism for transmitting torque from a crank shaft (not shown) to a main drive Shaft 709 in a transmission (not shown).

The torque converter 1m primrily includes an impeller 13, a turbine 14, and a stator 15. The impeller 13 along with a front cover 702 coupled to the crank shaft (not shown) of an engine. The impeller 13 and the front cover 702 constitutes a hydraulic oil chamber. The turbine 14 is coupled to the main drive shaft 709 through a turbine hub 708. The stator 15 is placed between inner circumferential portions of the impeller 13 and turbine hub 708.

A lock-up clutch 710 is placed in a space between the front cover 702 and the turbine 704. The lock-up clutch 710 primarily includes an inertia plate 711, a plurality of coil springs 712, a power output plate 715, and a piston 716.

The inertia plate 711 is a disc-shaped element placed on a side of the front cover 702. An inner circumferential end of the inertia plate 711 is tubular in shape, protruding toward the impeller 13 and is supported by a thrust bearing 713 and a bush 714 so as to relatively rotate on the front cover 2. In an outer circumference of the inertia plate 711, an annular weight 711a is fixed.

The power output plate 15 is a disc-shaped element of which inner circumferential end is fixed to the turbine hub 8, and an annular friction element 15a is fixed to opposite surfaces of its outer circumferential portion.

The piston 16 is a disc-shaped element placed between the power output plate 15 and the turbine 4, and has its inner circumferential end supported by the turbine hub 8 through a bearing 19 so as to relatively rotate to the turbine hub 8 and to move in axial directions. Moreover, the piston 16 has its outer circumferential portion engaged with the front cover 2 through a plurality of coil springs 12.

In a configuration as mentioned above, outer circumferential portion of the inertial plate 11, the friction element 15a of the power output plate 15 and an outer circumferential portion of the piston 16 together constitute a clutch 50. A space I is defined by and between a back surface of the turbine 4 and the piston 16, a space II is defined by and between the piston 16 and the inertia plate 11, and a space III is defined by and between the inertia plate 11 and the front cover 2. The space I and the space III are open to each other in their respective outer circumferential portions. The space II is closed at its outer circumferential portion with the piston 16 pressing the friction element 15a against the power output plate 15. The space II has its inner circumferential portion open to the third oil duct 148 (FIGS. 9 and 10) passing through the main drive shaft 709.

An operation of the torque converter will be described below.

In a state depicted in FIG. 9, a lock-up solenoid 144 is turned off, and hydraulic oil is drained from a valve of the lock-up solenoid 144. Consequently, there is no hydraulic pressure in a head of a piston of a lock-up control valve 143, and the piston is pushed to the right in the drawing by force of a spring to close a drain. In this way, the lock-up control valve 143 leads the hydraulic oil from a pressure regulator 142 to the third oil duct 148. As a result, hydraulic pressure works in the space II within the torque converter 1m, and the piston 716 moves to the right in FIG. 22. Under the condition, the friction element 715a of the power output plate 715 is detached from the inertia plate 711 and the piston 716; that is, the lock-up clutch 710 is disengaged. At this time, the weight 711a is released from a power input unit and a power output unit.

When the speed of the vehicle reaches a certain level, the lock-up solenoid 144 responds to a signal from a speed sensor (not shown) to turn on. Thus, as shown in FIG. 10, hydraulic pressure causes the piston 143a of the lock-up control valve 143 to move to the left in FIG. 10, so that the hydraulic oil within the space II of the torque converter 1m is drained through the third oil duct 148 and the lock-up control valve 143. This results in the hydraulic pressure within the space II becoming lower than those in the space I and the space III, and this, in turn, causes the piston 716 to move to the left in FIG. 21. In this situation, the friction element 715a of the power output plate 715 is held by and between the inertia plate is 711 and the piston 716. Under this condition, torque is transmitted through the coil spring 712. The weight 711a increases a ratio of moment of inertia of the power output mechanism to the power input mechanism (as defined above). As a result, resonance frequency is reduced, and occurrence of abnormal sound like clattering sound and internal indistinct sound in the transmission can be reduced during an ordinary driving.

Embodiment 14

Figure 22:
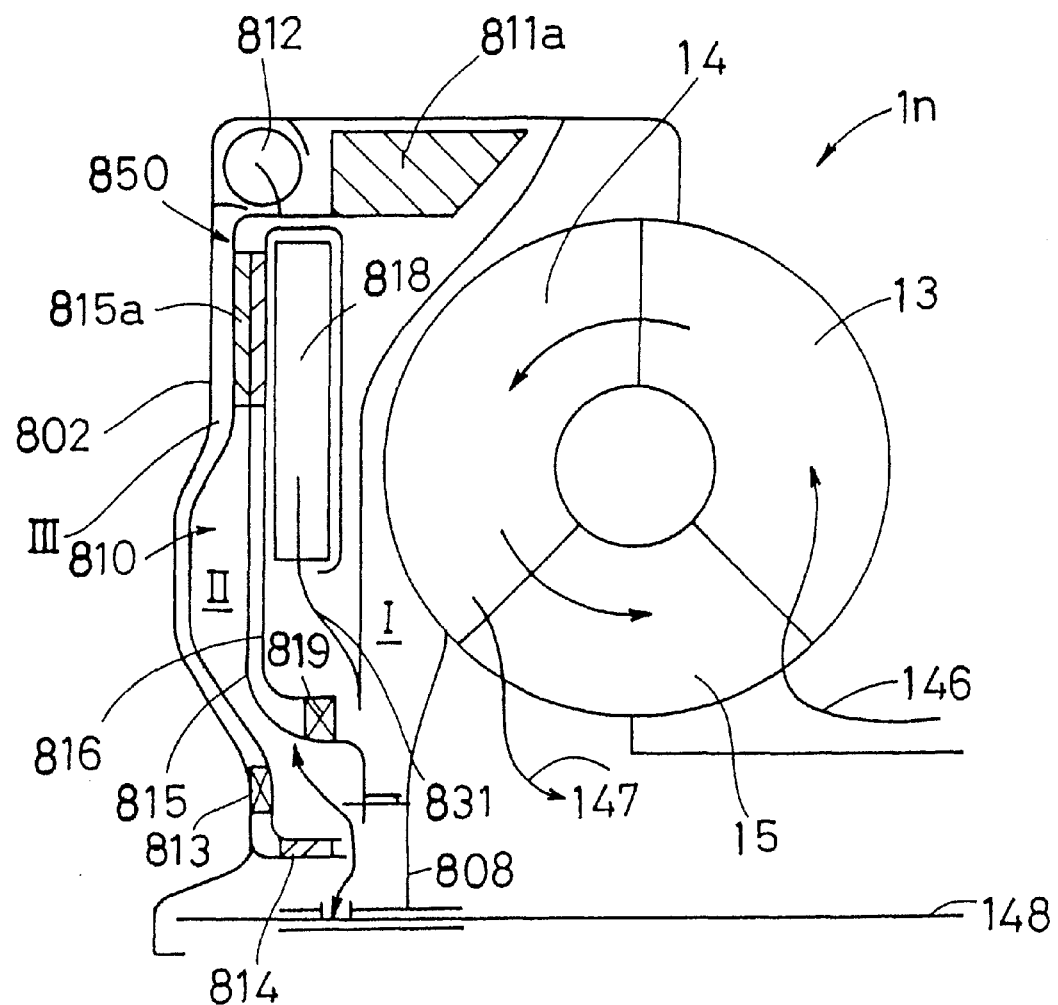
FIG. 22 a schematic side view similar to FIG. 1, of a torque converter in accordance with a fourteenth embodiment of the present invention.
Figure 23:
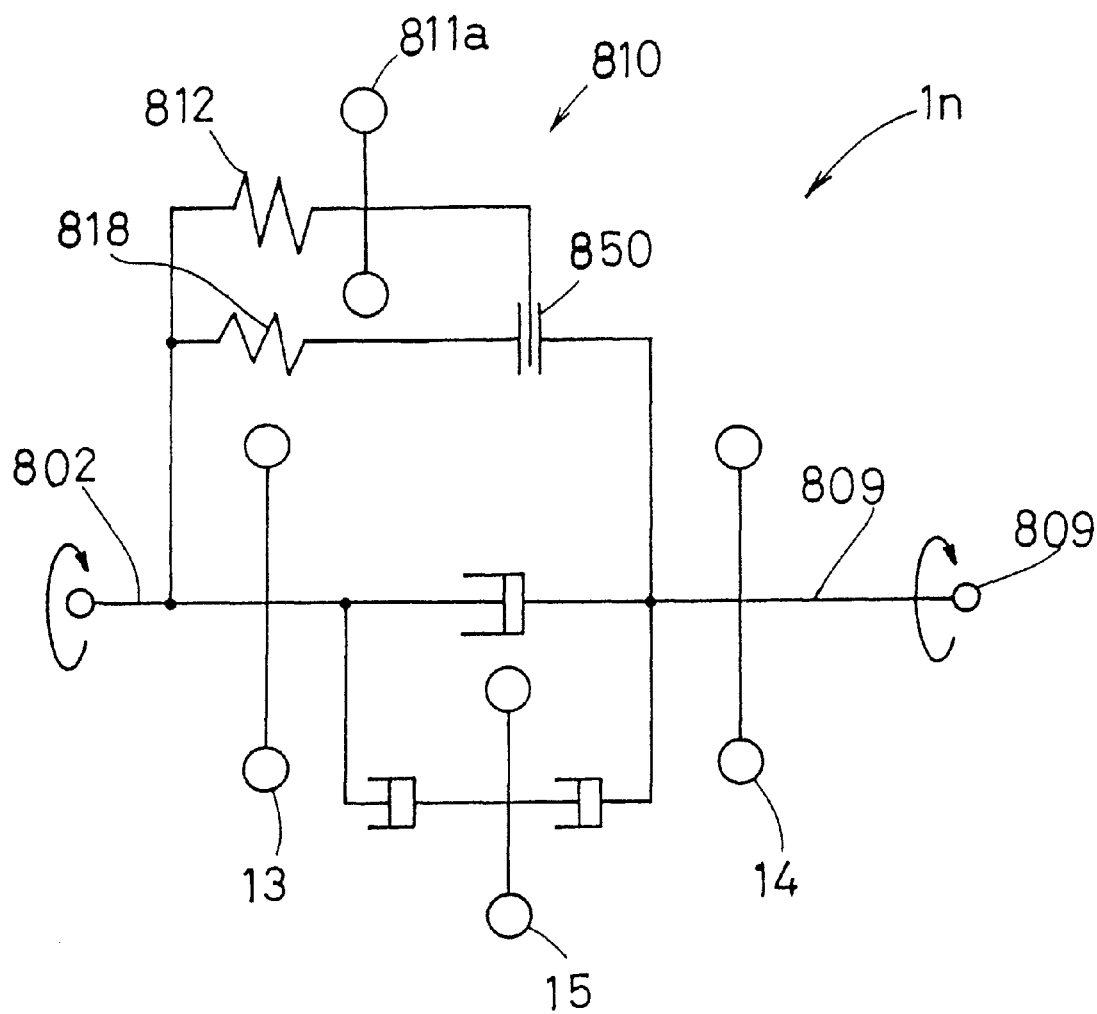
FIG. 23 is a force diagram showing a dynamic model of the torque converter depicted in FIG. 22.

FIG. 22 is a schematic sectional view showing a torque converter 1n in accordance with a fourteenth embodiment of the present invention while FIG. 23 is a view showing a dynamic model of the same.

A lock-up clutch 810 is placed in a space between a front cover 802 and a turbine 14. The lock-up clutch 810 primarily includes an inertia plate 811, a plurality of coil springs 812, a power output plate 815, a piston 816, and a pair of undulated ribbon-like plate springs 818 disposed within the viscous fluid charged chamber.

The inertia plate 811 is a disc-shaped element placed on a side of the front cover 802. An inner circumferential end of the inertia plate 811 is tubular in shape, protruding toward the impeller 13, and it is supported by a thrust bearing 813 and a bush 814 so as to relatively rotate to the front cover 802. In an outer circumferential portion of the inertia plate 811, an annular weight 811a is fixed. Moreover, the outer circumferential portion of the inertia plate 811 engages with the front cover 802 through the coil springs 812.

The power output plate 815 is a disc-like element of which inner circumferential end is fixed to a turbine hub 808, and an annular friction element 815a is fixed to opposite surfaces of its outer circumferential portion.

The piston 816 is a disc-like element placed between the power output plate 815 and the turbine 14 and defines the annular viscous fluid charged chamber along with other plate elements. The piston 816 has its inner circumferential end supported by the turbine hub 808 through a bearing 819 so as to relatively rotate to the turbine hub 808 and move in axial directions.

A plate element 831 is fixed to the front cover 802 and has its part inserted in the viscous fluid charged chamber and engaged with the undulated ribbon-like plate springs 818.

In a configuration as mentioned above, an outer circumferential portion of the inertia plate 811, the friction element 815a of the power output plate 815 and an outer circumferential portion of the piston 816 together constitute a clutch 850.

A space I is defined by and between a back surface of the turbine 14 and the piston 816, a space II is defined by and between the piston 816 and the inertia plate 811, and a space III is defined by and between the inertia plate 811 and the front cover 802. The space I and the space III are open to each other in their respective outer circumferential portions. The space II is closed at its outer circumferential portion with the piston 816 pressing the friction element 815a against the power output plate 815. The space II has its inner circumferential portion open to the third oil duct 148 (FIGS. 9 and 10) passing through the main drive shaft 809.

In a state where the piston 816 moves to the right in FIG. 22, the friction element 815a is released from the inertia plate 811 and the piston 816; that is, the lock-up clutch 810 is disengaged. In this situation, the weight 311a of the inertia plate 811 functions as a dynamic damper against the front cover 802 because of the coil springs 812 intervening therebetween to effectively dampen vibration from the engine.

In a state where the piston 816 moves to the left in FIG. 22, the friction element 815a is held by and between the inertia plate 811 and the piston 816. Under this condition, as can be seen in FIG. 23, torque transmission is performed through both the coil springs 812 and the undulated ribbon-like plate springs 818. The weight 811a increases a ratio of moment of inertia of a power output mechanism to a power input mechanism with a boundary of the coil springs 812 and the undulated ribbon-like plate springs 818 therebetween. As a result, resonance frequency is reduced to the idle speed of the vehicle, and occurrence of abnormal sound like clattering sound and internal indistinct sound in the transmission can be reduced during an ordinary drive.

Embodiment 15

Figure 24:
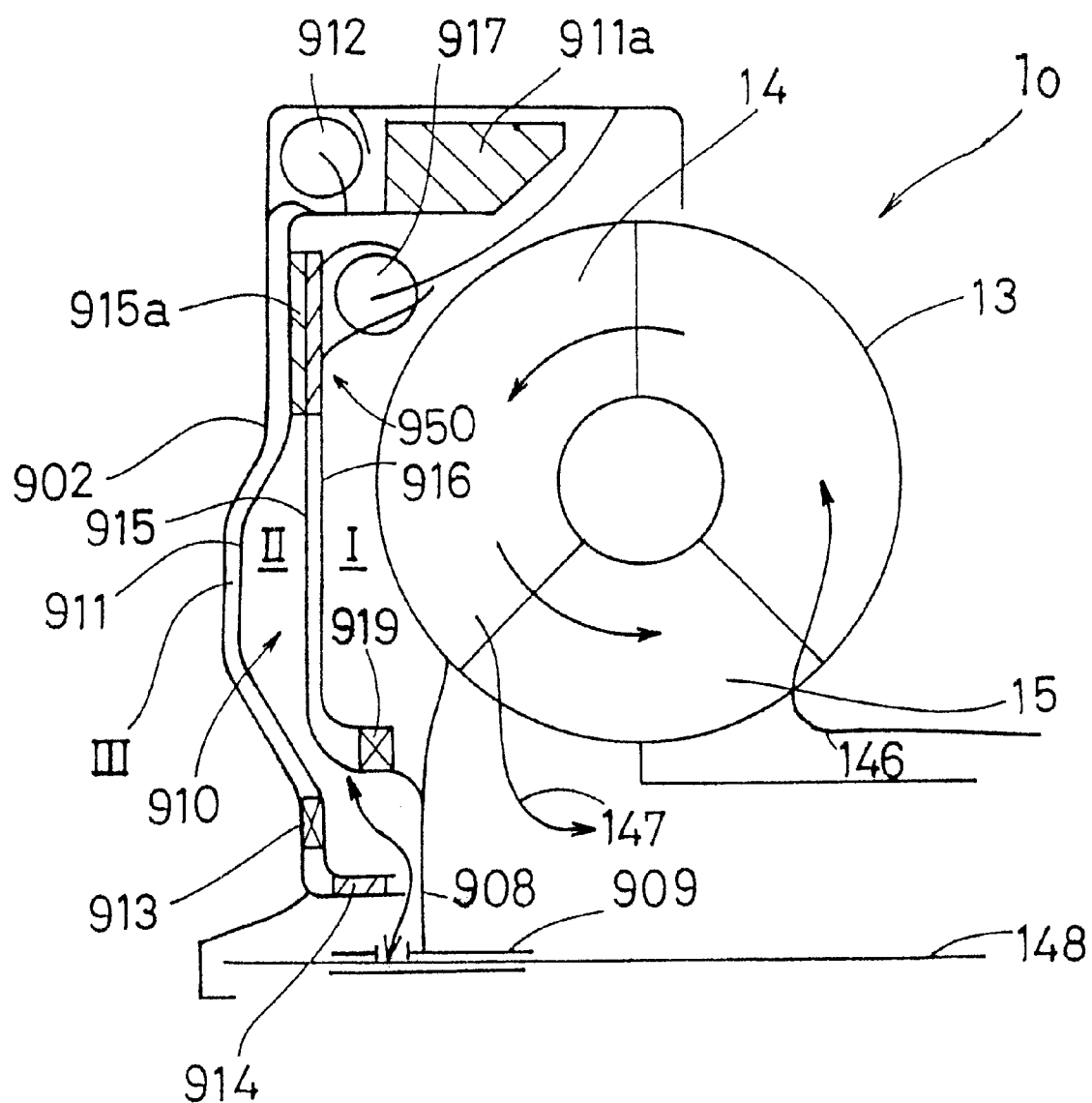
FIG. 24 a schematic side view similar to FIG. 1, of a torque converter in accordance with a fifteenth embodiment of the present invention.

FIG. 24 is a schematic sectional diagram showing a torque converter 1o in accordance with a fifteenth embodiment of the present invention. The torque converter 1o is a mechanism for transmitting torque from a crank shaft (not shown) in an engine to a main drive shaft 909 of a transmission (not shown).

The torque converter 1o primarily includes three types of runners, namely, an impeller 13, a turbine 14 and a stator 15. The impeller 13 together with a front cover 902 coupled to the crank shaft (not shown) of the engine (not shown). The impeller 13 and the front cover 902 define a hydraulic oil chamber. The turbine 14 is coupled to the main drive shaft 909 through a turbine hub 908. The stator 15 is placed between inner circumferential portions of the impeller 13 and turbine hub 908.

A lock-up clutch 910 is placed in a space between the front cover 902 and the turbine 14. The lock-up clutch 910 primarily includes an inertia plate 911, a plurality of first coil springs 912, a power output plate 915, a piston 916, and a plurality of second coil springs 917.

The inertia plate 911 is a disc-shaped element placed on a side of the front cover 902. An inner circumferential end of the inertia plate 911 is tubular in shape, protruding toward the transmission, and it is supported by a thrust bearing 913 and a bush 914 so as to rotate relative to the front cover 902. In an outer circumferential portion of the inertia plate 911, an annular weight 911a is fixed. Moreover, the outer circumferential portion of the inertia plate 911 engages with the front cover 902 through the first coil springs 912.

The power output plate 915 is a disc-like element of which inner circumferential end fixed to a turbine hub 8, and an annular friction element 915a is fixed to opposite surfaces of its outer circumferential portion.

The piston 916 is a disc-like element placed between the power output plate 915 and the turbine 14 and has its inner circumferential end supported to the turbine hub 908 through a bearing 919 so as relatively rotate to the turbine hub 908 and to move in axial directions. An outer circumferential portion of the piston 916 engages with the front cover 902 through the second coil springs 917.

In a configuration as mentioned above, an outer circumferential portion of the inertia plate 911, the friction element 915a of the power output plate 915 and the outer circumferential portion of the piston 916 together constitute a clutch 950. A space I is defined by and between a back surface of the turbine 14 and the piston 916, a space II is defined by and between the piston 916 and the inertia plate 911, and a space III is defined by and between the inertia plate 911 and the front cover 902. The space I and the space III are open to each other in their respective outer circumferential portions to allow fluid flow. The space II is closed at its outer circumferential portion with the piston 916 pressing the friction element 915*a* against the power output plate 915. The space II has its inner circumferential portion conducted to the third oil duct 148 (FIGS. 9 and 10) passing through the main drive shaft 909.

An operation of the torque converter will now be described.

In a state depicted in FIG. 9, a lock-up solenoid 144 is turned off, the hydraulic oil is drained from a valve of the lock-up solenoid 144. As a result, there is no hydraulic pressure in a head of a piston 143*a* of a lock-up control valve 143, and the piston is pushed to the right in the drawing by force of a spring to close a drain. Thus, the lock-up control valve 143 leads the hydraulic pressure from a pressure regulator 142 to the third oil duct 148. This results in the hydraulic pressure working in the space II within the torque converter 1*o*, so that the piston 916 is moved to the right in FIG. 24. Under this condition, the friction element 915*a* of the power output plate 915 is released from the inertia plate 911 and the piston 916; that is, the lock-up clutch 910 is disengaged. In this situation, the weight 911*a* of the inertia plate 911 functions as a dynamic damper against the front cover 902 because of the first coil springs 912 to effectively dampen vibration from the engine.

When a speed of the vehicle reaches a certain level, the lock-up solenoid 144 responds to a signal from a speed sensor (not shown) to turn on. Thus, as shown in FIG. 10, the hydraulic pressure causes the piston of the lock-up control valve 143 to the left in FIG. 10, and this, in turn, causes the hydraulic oil in the space II of the torque converter 1*o* to be drained through the third oil duct 948 and the lock-up control valve 943. As a result, the hydraulic pressure within the space II becomes lower than those in the space I and the space III, and consequently, the piston 916 moves to the left in FIG. 24. In this situation, the friction element 915*a* of the power output plate 915 is held between the inertia plate 911 and the piston 916. Under the condition, which is similar to that shown in FIG. 23, torque transmission is performed through both the first and second coil springs 912 and 917 in a manner similar to springs 812 and 818 in FIGS. 22 and 23. Moreover, the weight 911*a* increases a ratio of moment of inertia of a power output mechanism to a power input mechanism where the boundary therebetween is the first coil springs 912 and the second coil springs 917. In consequence, resonance frequency is reduced to the number of idle revolution of the speed of the vehicle, and occurrence of abnormal sound like clattering sound and internal indistinct sound in the transmission can be avoided during an ordinary drive.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A lock-up clutch of a torque converter comprising:

a main body;

an impeller fixed to an inner surface of said main body;

a turbine mounted within said main body adjacent to said impeller for rotation with respect to said impeller;

a lock-up clutch mechanism connected to said turbine for rotation therewith; and an undulated plate spring engageable with said lock-up clutch mechanism for absorbing vibration in response to engagement of said lock-up clutch mechanism.

2. The lock-up clutch as in claim 1, wherein:

said lock-up clutch comprises a piston element selectively engageable and disengagable with a front cover of said main body; and wherein said undulated plate spring is disposed between said piston element and turbine, allowing limited angular displacement therebetween.

3. The lock-up clutch as in claim 2 wherein said undulated plate spring is disposed within a viscous fluid charged chamber formed on said piston element.

4. The lock-up clutch as in claim 2 wherein said undulated plate spring is disposed within a viscous fluid charged chamber formed on a front cover of said main body.

5. The lock-up clutch as in claim 1, wherein said undulated plate spring is formed with a plurality of arcuate portions and a plurality of lever portions which alternate and are unitarily formed, and alternating pairs of said lever portions are provided with a hole for viscous fluid passage.

6. The lock-up clutch as in claim 1, further comprising;

a weight element disposed between a front cover of said main body and said turbine;

a piston element coupled to said turbine, said piston element configured for coupling and uncoupling from said weight element;

a hydraulic pressure control device controlling hydraulic pressure within said main body for controlling coupling and uncoupling of said piston element from said weight element; and said undulated plate spring elastically coupling said weight element with the front cover in circular directions.

7. A lock-up clutch comprising:

a main body;

an impeller fixed to an inner surface of said main body;

a turbine mounted within said main body adjacent to said impeller for rotation with respect to said impeller;

a lock-up clutch mechanism connected to said turbine;

a spring coupled to said lock-up clutch mechanism for absorbing vibration in response to engagement of said lock-up clutch mechanism;

a weight element disposed between a front cover of said main body and said turbine;

a piston element coupled to said turbine, said piston element configured for coupling and uncoupling from said weight element;

a hydraulic pressure control device controlling hydraulic pressure within said main body for controlling coupling and uncoupling of said piston element from said weight element; and said spring elastically coupling said weight element with the front cover in circular directions.

8. The lock-up clutch as in claim 7 wherein said spring is a coil spring.

9. The lock-up clutch as in claim 7 wherein said spring is an elongated undulated plate spring.

* * * * *